United States Patent [19]
Volpe

[11] Patent Number: 5,602,968
[45] Date of Patent: Feb. 11, 1997

[54] TASK SPACE ANGULAR VELOCITY BLENDING FOR REAL-TIME TRAJECTORY GENERATION

[75] Inventor: Richard A. Volpe, La Crescenta, Calif.

[73] Assignee: The United States of America as represented by the Administrator of the National Aeronautics and Space Administration, Washington, D.C.

[21] Appl. No.: 238,041

[22] Filed: May 2, 1994

[51] Int. Cl.$^6$ .......................... G05B 13/00; G05B 19/42
[52] U.S. Cl. .............................. 395/97; 395/80; 395/86; 395/87; 318/568.18
[58] Field of Search ..................... 395/97, 80, 86, 395/87; 318/568.18

[56] References Cited

U.S. PATENT DOCUMENTS

| | | | |
|---|---|---|---|
| 4,218,172 | 8/1980 | Freund | 395/97 |
| 4,360,886 | 11/1982 | Kostas et al. | 364/551 |
| 4,529,921 | 7/1985 | Moribe | 395/97 |
| 4,554,497 | 11/1985 | Nozawa et al. | 318/636 |
| 4,593,366 | 6/1986 | Sugimoto et al. | 364/169 |
| 4,616,326 | 10/1986 | Meier et al. | 395/93 |
| 4,663,726 | 5/1987 | Chand et al. | 395/87 |
| 4,675,502 | 6/1987 | Haefner et al. | 219/124.34 |
| 4,683,543 | 7/1987 | Hirasawa et al. | 395/87 |
| 4,689,756 | 8/1987 | Koyama et al. | 395/87 |
| 4,698,777 | 10/1987 | Toyoda et al. | 395/87 |
| 4,727,303 | 2/1988 | Morse et al. | 318/616 |
| 4,734,866 | 3/1988 | Bartelt et al. | 364/174 |
| 4,771,389 | 9/1988 | Takahashi et al. | 364/167.01 |
| 4,797,835 | 1/1989 | Kurami et al. | 395/87 |
| 4,821,207 | 4/1989 | Ming et al. | 395/87 |
| 4,879,663 | 11/1989 | Fuehrer | 395/85 |
| 4,887,222 | 12/1989 | Miyake et al. | 395/98 |
| 4,967,125 | 10/1990 | Hara | 395/87 |
| 5,015,821 | 5/1991 | Sartorio et al. | 219/124.34 |
| 5,020,001 | 5/1991 | Yamamoto et al. | 395/82 |
| 5,046,852 | 9/1991 | Hametner et al. | 356/398 |
| 5,129,045 | 7/1992 | Stelzer et al. | 395/87 |
| 5,157,315 | 10/1992 | Miyake et al. | 395/87 |
| 5,285,525 | 2/1994 | Nagao et al. | 395/87 |
| 5,287,049 | 2/1994 | Olomski et al. | 318/568 |
| 5,430,643 | 7/1995 | Seraji | 364/167.01 |
| 5,467,430 | 11/1995 | Itoh | 395/95 |

OTHER PUBLICATIONS

Angeles et al, "Trajectory planning in Robotics Continuous-Path Applications", IEEE Journal of Robotics and Automation, vol. 4, No. 4, Aug. 1988.

Yeung et al, "Efficient Parallel Algorithms and VLSI Architectures of Manipulator Jacobian Computation", IEEE Transactions on Systems, Man, and Sybernetics, vol. 19, No. 5, Sep./Oct. 1989.

M. Brady and Others (editors). Robot Motion: Planning and Control MIT Oressm Cambridge, MA, 1982.

(List continued on next page.)

Primary Examiner—George B. Davis
Attorney, Agent, or Firm—John H. Kusmiss

[57] ABSTRACT

The invention is embodied in a method of controlling a robot manipulator moving toward a target frame $F_0$ with a target velocity $v_0$ including a linear target velocity $v$ and an angular target velocity $\omega_0$ to smoothly and continuously divert the robot manipulator to a subsequent frame $F_1$ by determining a global transition velocity $v_1$, the global transition velocity including a linear transition velocity $v_1$ and an angular transition velocity $\omega_1$, defining a blend time interval $2\tau_0$ within which the global velocity of the robot manipulator is to be changed from a global target velocity $v_0$ to the global transition velocity $v_1$ and dividing the blend time interval $2\tau_0$ into discrete time segments $\delta t$. During each one of the discrete time segments $\delta t$ of the blend interval $2\tau_0$, a blended global velocity $v$ of the manipulator is computed as a blend of the global target velocity $v_0$ and the global transition velocity $v_1$, the blended global velocity $v$ including a blended angular velocity $\omega$ and a blended linear velocity $v$, and then, the manipulator is rotated by an incremental rotation corresponding to an integration of the blended angular velocity $\omega$ over one discrete time segment $\delta t$.

23 Claims, 7 Drawing Sheets

OTHER PUBLICATIONS

J. Canny. Collision Detection for Moving Polyhedra. IEEE Transactions on Pattern Analysis and Machine Intelligence, 8 (2), Mar. 1986.

J. Craig. Introduction to Robotics: Mechanics and Control. Addison–Wesley, Reading, Massachusetts, 1986.

H. Goldstein. Classical Mechanics. Addison–Wesley, Reading, Mass. 1980.

C. Lin and P. Chang. Formulation and Optimization of Cubic Polynomial Joint Trajectories for Industrial Robots. IEEE Transactions on Automatic Control, 28(12):1066–1073, 1983.

J. Lloyd and V. Hayward. Real–Time Trajectory Generation Using Blend Functions In IEEE International Conference on Robotics and Automation, Sacramento, California, Apr. 1991.

M. Mujtaba. Discussion of Trajectory Calculation Methods. Stanford University, Artificial Intelligence Laboratory, AIM 285.4, 1977.

R. Paul. Robot Manipulators: Mathematics, Programming and Control MIT Press, Cambridge, MA, 1981.

R. Paul. Manipulator Cartesian Path Control, pp. 245–263. MIT Press Cambridge, Mass., 1982.

R. Paul and H. Zhang. Robot Motion Trajectory Specification and Generation. In Second International Symposium on Robotics Research, Kyoto, Japan, Aug. 1984.

R. Rosenberg and D. Karnopp. Introduction to Physical System Dynamics. McGraw–Hill, New York, 1983.

H. Seraji and R. Colbaugh. Improved Configuration Control for Redundant Robots. Journal of Robotics Systems, 7(6), 1990.

R. Taylor. Planning and Execution of Straight Line Manipulator Trajectories, pp. 265–286. MIT Press, Cambridge, Mass., 1982.

S. Thompson and R. Patel. Formulation of Joint Trajectories for Industrial Robots Using B–Splines. IEEE Transactions on Industrial Electronics, 34(2):192–199, 1987.

D. Whitney. Resolved Motion Rate Control of Manipulators and Human Prostheses. IEEE Transactions on Man–Machine Systems, 10(2):49–53, Jun. 1969.

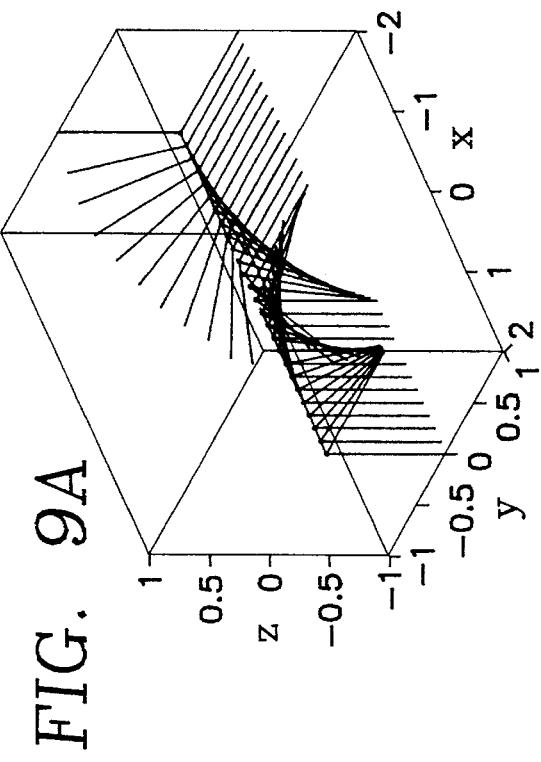
FIG. 9B
FIG. 9A
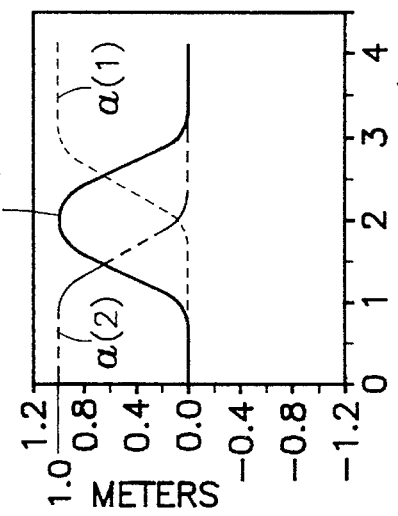
FIG. 10C
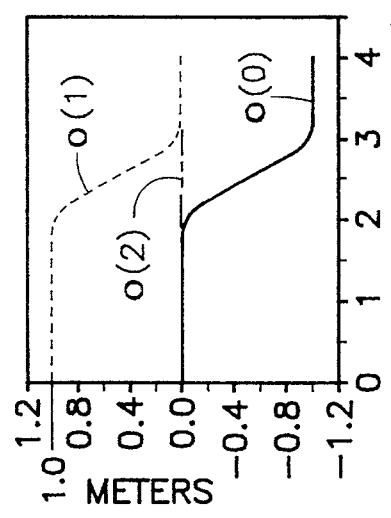
FIG. 10B
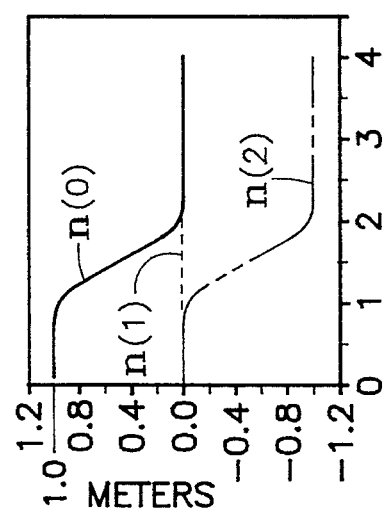
FIG. 10A

TASK SPACE ANGULAR VELOCITY BLENDING FOR REAL-TIME TRAJECTORY GENERATION

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to a compliant motion control system for controlling a robot using angular velocity blending in task space in performing specific tasks.

2. Background Art

The specification below makes reference to the following publications by number:

References

[1] M. Brady and others (editors). *Robot Motion: Planning and Control.* MIT Press, Cambridge Mass., 1982.

[2] J. Canny. Collision Detection for Moving Polyhedra. *IEEE Transactions on Pattern Analysis and Ma*

[3] J. Craig. *Introduction to Robotics: Mechanics and control.* Addison-Wesley, Reading, Mass., 1986.

[4] H. Goldstein. *Classical Mechanics.* Addison-Wesley, Reading, Mass., 1980.

[5] C. Lin and P. Chang. Formulation and Optimization of Cubic Polynomial Joint Trajectories for Industrial Robots. *IEEE Transactions on Automatic Control,* 28(12): 1066–1073, 1983.

[6] J. Lloyd and V. Hayward. Real-time Trajectory Generation Using Blend Functions. In *IEEE International Conference on Robotics and Automation,* Sacramento, Calif., April 1991.

[7] M. Mujtaba. *Discussion of Trajectory Calculation Methods.* Stanford University, Artificial Intelligence Laboratory, AIM 285.4, 1977.

[8] R. Paul. *Robot Manipulators: Mathematics, Programming and Control.* MIT Press, Cambridge, Mass., 1981.

[9] R. Paul. *Manipulator Cartesian Path Control,* pages 245–263. MIT Press, Cambridge, Mass., 1982.

[10] R. Paul and H. Zhang. Robot Motion Trajectory Specification and Generation. In *Second International Symposium on Robotics Research,* Kyoto, Japan, August 1984.

[11] R. Rosenberg and D. Karnopp. *Introduction to Physical System Dynamics.* McGraw-Hill, New York, 1983.

[12] H. Seraji and R. Colbaugh. Improved Configuration Control for Redundant Robots. *Journal of Robotics Systems,* 7(6), 1990.

[13] R. Taylor. *Planning and Execution of Straight Line Manipulator Trajectories,* pages 265–286. MIT Press, Cambridge, Mass., 1982.

[14] S. Thompson and R. Patel. Formulation of Joint Trajectories for Industrial Robots Using B-Splines. *IEEE Transactions on Industrial Electronics,* 34(2): 192–199, 1987.

[15] D. Whitney. Resolved Motion Rate Control of Manipulators and Human Protheses. *IEEE Transactions on Man-Machine Systems,* 10(2): 49–53, June 1969.

1 Introduction

Just as manipulator control can be effectively accomplished in joint space or task space, trajectories for the manipulator can also be specified in joint or task space. Typically, the trajectory is specified in the same space in which the controller is working. However, conversion techniques can be used to translate the specified trajectory to the control space. For instance, inverse kinematics applied to a task space trajectory will provide setpoints to a joint space controller. Since task space trajectory specification is usually considered most useful (especially with task space control), the converse translation of a joint space trajectory to task space is uncommon.

Joint space trajectory generation is straightforward since each joint may be treated independently [8, 1, 3]. Typically, motion between specified joint values is dictated with a third, fourth, or fifth order polynomial. Some extension and optimization of this technique have been proposed [5, 14].

Task space trajectory generation has been addressed more extensively, because of the complexity inherent in it. Whitney proposed Resolved Rate control [15] to easily enable straight line motion or constant axis rotation of an end effector. However, this technique does not inherently address extended trajectory generation considerations. Foremost among these is the problem of blending changes in end effector orientation. Paul [8, 10] proposed blending of the Euler angles describing the relations of the initial and final frames to the intermediate one. This method blends one orientation to the next, but the path generated is not intuitively obvious. Worse, he proposes changing one Euler angle with a different blend profile from the others. Alternatively, Canny [2] utilizes quaternions to describe orientation. However, since he was addressing a different problem (collision detection), he does not discuss the issues of blending the quaternions. Craig [3] utilizes the similar angle-axis formulation, but represents the orientation of each via frame with respect to the world frame, not the previous frame as Paul had done. Thus, the blend of orientation parameters will produce a motion path that is dependent on the relation of the via frames to the world frame, not just their relation to each other. Finally, Lloyd and Hayward [6] developed an elegant method for creating variable position blend paths, but do not show an extension of the method for orientations.

As will be seen, Taylor [13] has proposed a scheme that provides smooth, intuitive, and repeatable position and orientation blends. Its major drawback is computational complexity. This paper presents a velocity based method that achieves the same results with a simpler formulation and significantly reduced computation time.

The next section presents the terminology employed for the solution description. Section 3 presents the proposed velocity blending formulation and described possible blend profile functions. Section 4 quickly discusses position path blending. Orientation blending is extensively discussed in Section 5, where Taylor's method is reviewed, angular velocity blending is presented, and the second order difference between them is analyzed. Sections 6 and 7 discuss implementational considerations and computational costs associated with the algorithms and show why velocity blending is preferable. Finally, Section 8 describes the results of simulation and real-time implementation.

2 Velocity Blending Terminology

A task frame is defined as the set containing the rotation matrix that specifies the end effector orientation, $R$, the end effector position, p, other scalar configuration control parameters (e.g. arm angle ψ [12]), and the transit to this arm pose, T. Thus, $$F_i = \{\mathcal{R}_i, p_i, \psi_i, T_i\} \quad (1)$$

Typically the end effector orientation is specified by a rotation matrix composed of the vectors defining the end effector orientation with respect to the stationary world frame [8].

$$\mathcal{R}_i = [n_i, o_i, a_i] \quad (2)$$

To specify a frame, rotation matrix, or vector with respect to another frame, the former is proceeded with a superscript. For instance, a frame, rotation, or vector with respect to the world frame is denoted by $^\omega F$, $^\omega \mathcal{R}$, $^\omega p$.

In between two sequential frames, the desired linear velocity of the end effector is simply the difference in position over time:

$$v_i = \frac{\Delta p}{\Delta t} = \frac{p_i - p_{i-1}}{T_i} \quad (3)$$

The angular velocity is obtained from the equivalent angle-axis formulation for a rotation from one frame to another [3]:

$$\omega_i = k_i \phi_i / T_i \quad (4)$$

$$k_i \sin \phi_i = \frac{1}{2}(n_{i-1} \times n_i + o_{i-1} \times o_i + a_{i-1} \times a_i) \quad (5)$$

$$\cos \phi_i = \frac{1}{2}(n_{i-1} \cdot n_i + o_{i-1} \cdot o_i + a_{i-1} \cdot a_i - 1) \quad (6)$$

where motion at velocity ω for time Δt causes a rotation of:

$$\mathcal{R}[\omega \Delta t] = \mathcal{R}[k,\phi] = \begin{bmatrix} k_x k_x V_\phi + C_\phi & k_x k_y V_\phi - k_z S_\phi & k_x k_z V_\phi + k_y S_\phi \\ k_x k_y V_\phi + k_z S_\phi & k_y k_y V_\phi + C_\phi & k_y k_z V_\phi - k_x S_\phi \\ k_x k_z V_\phi - k_y S_\phi & k_y k_z V_\phi + k_x S_\phi & k_z k_z V_\phi + C_\phi \end{bmatrix} \quad (7)$$

with $S_\phi = \sin_\phi$, $C_\phi = \cos_\phi$, and $V_\phi = 1 - \cos_\phi$.

If the magnitude of Equation (5) is zero, the direction of k is indeterminant. If Equation (6) equals +1, then the orientations of the successive frames are identical, and $\omega_i = [0, 0, 0]$. Otherwise, Equation (6) equals −1, and k must be determined from the columns of the homogeneous transform $R = {}^\omega \mathcal{R}_{i-1}^{-1} {}^\omega \mathcal{R}_i$. From the first column of Equation (7) we have:

$$k_x = \sqrt{\frac{R_{11} + 1}{2}} \quad (8)$$

$$k_y = \frac{R_{21}}{2k_x} \quad (9)$$

$$k_z = \frac{R_{31}}{2k_x} \quad (10)$$

If $k_x = 0$, another column must be used, and a similar set of solutions calculated.

Finally, Equations (3) and (4) may be incorporated into a global definition of frame velocity:

$$v \equiv [v, \omega, \dot\psi] \quad (11)$$

where the scalar velocity is also calculated as in Equation (3).

It is the object of the present invention to provide a velocity blending robot control process which requires fewer computation steps and is therefore faster than prior art processes.

SUMMARY OF THE INVENTION

The invention is embodied in a method of controlling a robot manipulator moving toward a target frame $F_0$ with a target velocity $v_0$ including a linear target velocity v and an angular target velocity $\omega_0$ to smoothly divert the robot manipulator to a subsequent frame $F_1$, the target frame being associated with a target transition time $T_0$ and the subsequent frame being associated with a subsequent transition time $T_1$, by determining a global transition velocity $v_1$ necessary to move the manipulator from the target frame $F_0$ to the subsequent frame $F_1$ within the subsequent transition time $T_1$, the global transition velocity including a linear transition velocity $v_1$ and an angular transition velocity $\omega_1$, defining a blend time interval $2\tau_0$ within which the global velocity of the robot manipulator is to be changed from the global target velocity $v_0$ to the global transition velocity $v_1$ and dividing the blend time interval $2\tau_0$ into discrete time segments δt. During each one of the discrete time segments δt of the blend interval $2\tau_0$, the following is performed: (a) compute a blended global velocity v of the manipulator as a blend of the global target velocity $v_0$ and global subsequent velocity $v_1$, the blended global velocity v being at least approximately equal to the target global velocity $v_0$ at the beginning of the blend time interval and at least approximately equal to the global transition velocity $v_1$ at the end of the blend time interval, the blended global velocity including a blended angular velocity ω and a blended linear velocity v, and then, (b) rotate the manipulator by an incremental rotation corresponding to an integration of the blended angular velocity ω over one discrete time segment δt.

BRIEF DESCRIPTION OF THE DRAWINGS

FIGS. 9A and 9B are diagrams depicting the spatial transition of the target frame (FIG. 9A) and the angular velocity vector (FIG. 9B) during an orientation blend using the process of Equation 57 with linear blending.

FIGS. 10A, 10B and 10C are graphs illustrating the component values of the unit vectors of the frames shown in FIG. 9A for the n, o and a components, respectively.

DETAILED DESCRIPTION OF THE PREFERRED EMBODIMENTS

3 Angular Velocity Blending

Figure 1A:
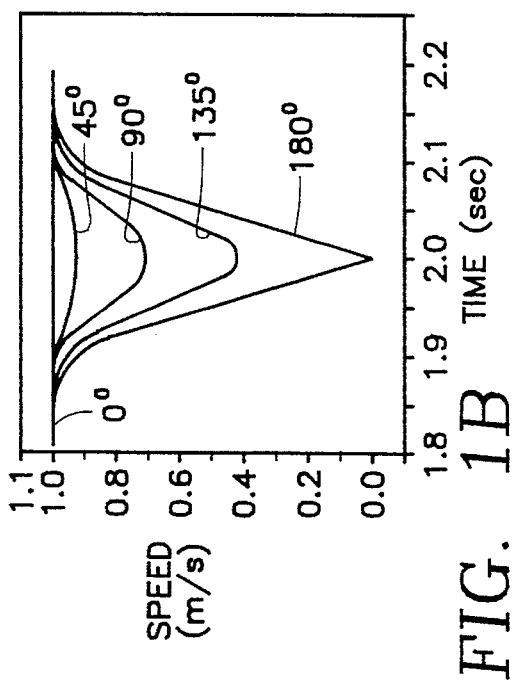
FIGS. 1A and 1B are graphs showing the blend speed for a spectrum of angles (0, 45, 90, 135 and 180 degrees) between the initial and final velocities, for the case in which the magnitudes of the initial and final velocities are equal using linear velocity blending (FIG. 1A) and third order polynomial velocity blending (FIG. 1B).

To move smoothly from one segment to another, the velocities of the segments must be blended together. To achieve this, many strategies employing linear velocity v have been suggested [9, 13, 5, 14, 6, 7]. These techniques are discussed below within the framework of the present invention.

The present invention introduces the concept of blending angular velocity by blending a global velocity vector v that includes both an angular velocity vector $\omega$ and the linear velocity vector v. The following discussion utilizes the global velocity v of Equation 11 which includes angular velocity $\omega$ with the following convention:

$$v_a = v_i \quad (12)$$
$$v_b = v_{i+1} \quad (13)$$

$$s = \frac{t - (t_i - \tau)}{2\tau} \quad (14)$$

$$t_i = \sum_{j=0}^{i} T_j \quad (15)$$

where $2\tau$ is the blend period, dependent on the maximum allowed acceleration, as will be shown below. This implies that the normalized time parameter $s \in [0, 1]$.

To smoothly blend from $v_a$ to $v_b$ over the interval s, the present invention employs a normalized blending function $f'(s) \in [0, 1]$. Utilizing this function, the velocity profile during the blend is:

$$v = v_a(1 - f'(s)) + v_b f'(s) \quad (16)$$
$$= v_a + (v_b - v_a) f'(s) \quad (17)$$

and the acceleration is:

$$a = (v_b - v_a) \frac{df'(s)}{dt} \quad (18)$$
$$= (v_b - v_a) \frac{df'(s)}{ds} \frac{1}{2\tau} \quad (19)$$

Note that this formulation ensures zero acceleration for $v_a = v_b$. Also, there is spatial symmetry of the path for the case of $|v_a| = |v_b|$, because the acceleration vector is parallel to the difference of the two velocity vectors, and will therefore bisect them.

If the maximum allowed acceleration is specified, then the blend period may be determined:

$$2\tau = \frac{(v_b - v_a)}{|a|_{max}} \frac{df'(s)}{ds} \bigg|_{s=1/2} \quad (20)$$

assuming that the derivative of $f'(s)$ is a symmetric function with a maximum value at s=0.5.

There are several simple choices available for blend functions. These are provided below, along with the resultant form of the velocity, acceleration, and blend time.

Linear Velocity Blending [13]

$$f'(s) = s \quad (21)$$

$$a = \frac{v_b - v_a}{2\tau} \quad (22)$$

$$2\tau = \frac{|v_b - v_a|}{|a|_{max}} \quad (23)$$

Third Order Polynomial Velocity Blending [9, 5]

$$f'(s) = -2s^3 + 3s^2 \quad (24)$$

$$a = \frac{(v_b - v_a)}{2\tau} (-6s^2 + 6s) \quad (25)$$

$$2\tau = \frac{|v_b - v_a|}{|a|_{max}} \frac{3}{2} \quad (26)$$

Cycloidal Velocity Blending [7]

$$f'(s) = \sin^2 \frac{\pi}{2} s \quad (27)$$

$$a = \frac{(v_b - v_a)}{2\tau} \frac{\pi}{2} \sin \pi s \quad (28)$$

$$2\tau = \frac{|v_b - v_a|}{|a|_{max}} \frac{\pi}{2} \quad (29)$$

The cycloid has a functional form very close to that of the O(3) polynomial, but does not have a discontinuous jerk (the derivative of the acceleration). In turn, the O(3) polynomial is superior to the linear form since the latter has discontinuous acceleration (and infinite jerk). The strength of the linear form is that it requires the least time since the acceleration is applied constantly at the maximum value allowed. Finally, note that many other functions are possible; in particular, all odd order polynomials.

Figure 1B:
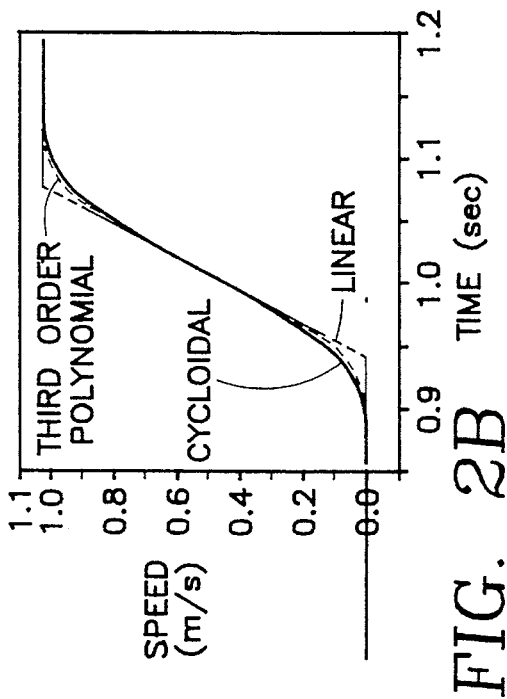

The graphs of FIG. 1 show the blend speed versus time for a spectrum of angles (0,45,90,135,180 deg) between the initial and final velocity vectors for the case of $|v_a|=|v_b|$, $|a|_{max}=10$ m/s². FIG. 1A shows the speeds for linear velocity blending. FIG. 1B shows the speeds for third order polynomial blending. The profiles for cycloidal blending are extremely close to those shown in FIG. 1B. The cusp in the plot for 180 degrees is due to a change in direction, and does not indicate a discontinuity in the acceleration. Also note that when the initial and final velocities are equal the speed is constant across the blend.

Figure 2A:
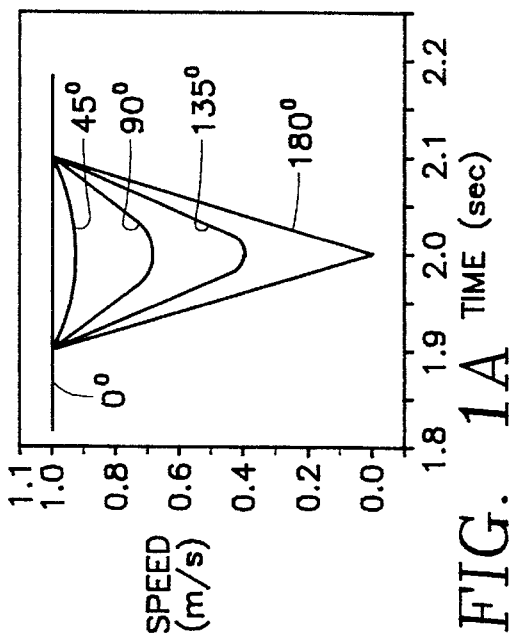
FIGS. 2A and 2B are graphs comparing linear, third order polynomial and cycloidal velocity blends of two orthogonal velocities of equal magnitude (FIG. 2A) and two parallel velocities of unequal magnitude (FIG. 2B).
Figure 2B:
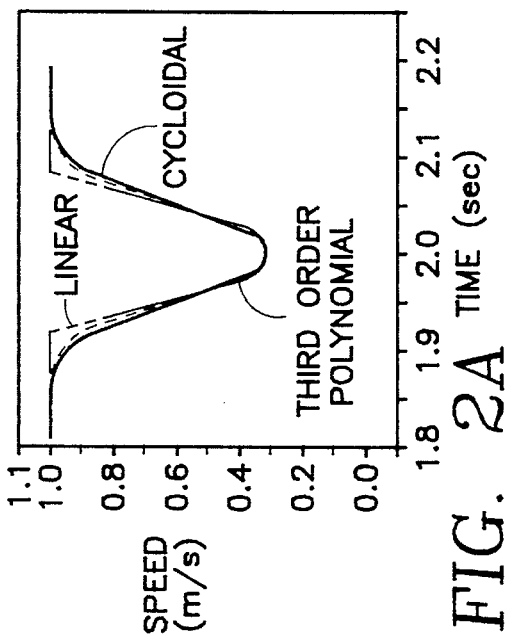

The graphs of FIG. 2 shows a comparison of linear, third order polynomial, and cycloidal velocity blends, with $|a|_{max}=10$ m/s². FIG. 2A shows the blend speed for a transition between two velocities of equal magnitude at an angle of 135 degrees. FIG. 2B shows a transition between two velocities of unequal magnitude. In this figure, the initial velocity is zero, however the transition curve has the same shape for two non-zero parallel velocities. Further, Equation (17) shows that this form of the blending occurs for each component of the resultant velocity vector.

4 Blending the Position Trajectory

The blend of the end effector position (p) is described by direct integration of Equation (3). (Scalar quantities are handled in the same way.) This yields:

$$p = \int v(s) dt = 2\tau \int v(s) ds \quad (30)$$

$$= p_a + v_a 2\tau s + (v_b - v_a) 2\tau \int f'(s) ds \quad (31)$$

$$= p_o + v_a 2\tau s + (v_b - v_a) 2\tau f(s) \quad (32)$$

where $p_o$ is the initial position as the blend is entered. The form of the integral of the blend function determines the spatial form trace by the path. For the three blend functions considered, we have:

$$\text{Linear: } f(s) = \frac{1}{2} s^2 \quad (33)$$

$$O(3) \text{ Polynomial: } f(s) = -\frac{1}{2} s^4 + s^3 \quad (34)$$

$$\text{Cycloidal: } f(s) = \frac{s}{2} - \frac{1}{2\pi} \sin \pi s \quad (35)$$

Equation (33) provides a second order polynomial, and the blend is parabolic. Equation (34) provides a fourth order polynomial, and the blend that is steeper. (Higher order even polynomial functions will be increasingly steeper.) The cycloidal blend path remains sinusoidal, but has the addition of a linear term.

Figure 3A:
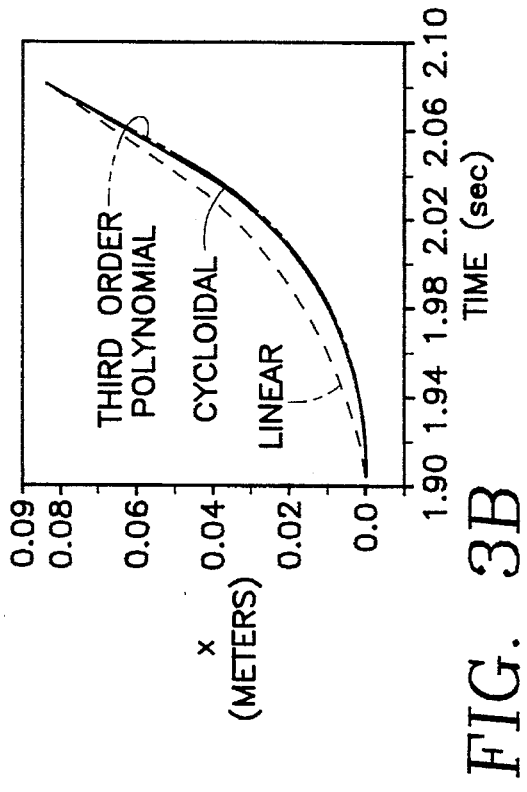
FIGS. 3A and 3B are graphs showing the spatial paths (FIG. 3A) and temporal paths (FIG. 3B) for a transition between two orthogonal velocities of equal magnitudes for a maximum acceleration magnitude of $10 m/s^2$.
Figure 3B:
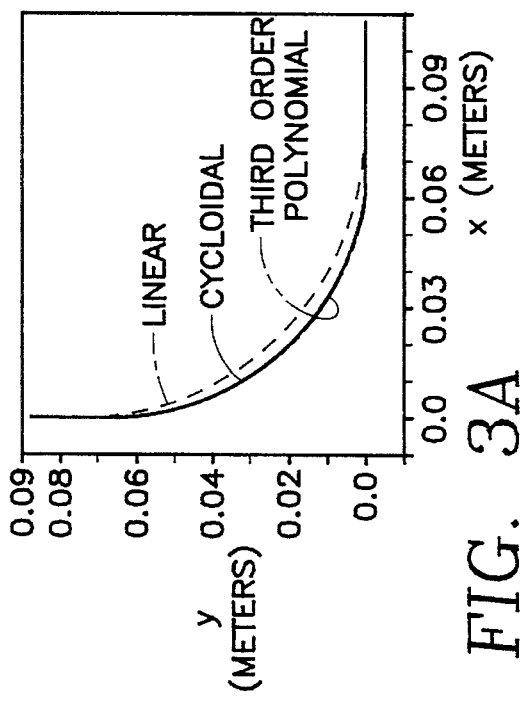

The graphs of FIG. 3 show the spatial and temporal paths for a transition between $v_a$ and $v_b$, such that $v_a \perp v_b$, $|v_a|=|v_b|$, with $|a|_{max}=10$ m/s$^2$. It is apparent from FIG. 3A that tighter cornering can be accomplished with polynomial and cycloidal bleeding. However, this requires longer blend times (or larger acceleration, and therefore greater joint torques from the actuators). FIG. 3B shows the positions as a function of time, which are essentially the integrals of the velocities shown in FIG. 3B. The form of these curves also represents the functional form of the position blend functions, Equations (33)–(35).

5 Blending the Orientation

Blending of the orientation is more complicated than position, since the angular velocities are nonholonomic. However, this section shows that a close approximation to analytic orientation blending can be obtained. This requires numeric integration of the rotations obtained from the instantaneous value of the blended angular velocity.

5.1 Rotation Matrix Blending for Orientation

In reference [13] Taylor proposed a method of blending orientation based on rotation matrices. A generalization of this method will be presented here. In this method, the amount of rotation contributed by each rotation matrix is scaled with the previously presented blend functions:

$$^\omega R(s) = ^\omega R_o \,^o R_a \,[\omega_a 2\tau(s-f(s))] \,^a R_b \,[\omega_b 2\tau f(s)] \quad (36)$$

$$= ^\omega R_o \,^o R_\alpha \,^\alpha R_\beta \quad (37)$$

Figure 4:
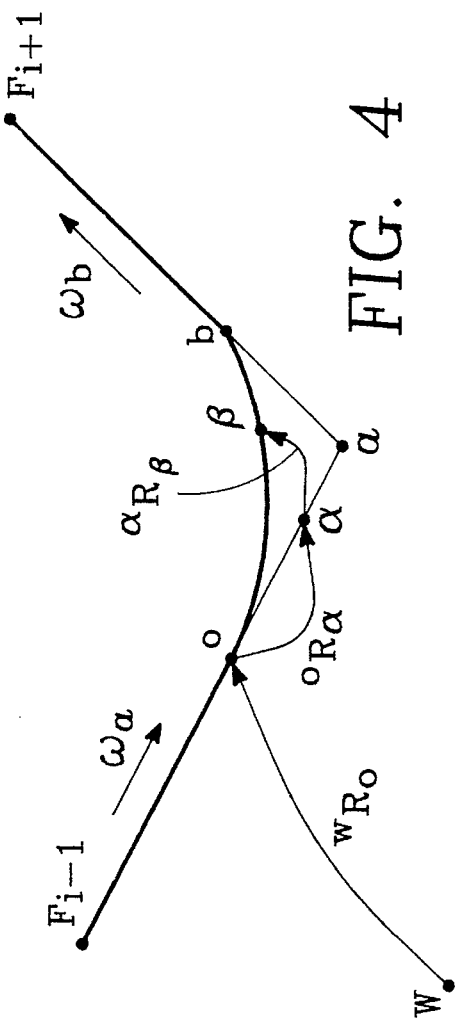
FIG. 4 is a graphical depiction of the velocity blending process of Equation 36.

The graph of FIG. 4 provides a graphical depiction of this blending method. Prior to the blend there is motion away from the orientation of the previous frame, $F_{i-1}$, and toward the intermediate orientation, $a=F_i$. The constant angular velocity before the blend is $\omega_a$, and the blend begins at orientation o. In this method, for each interval after o a rotation is construction and applied according to the rotation matrix blending described by Equation (36) or (37). After the normalized blend time s has become unity, the commanded angular velocity will be $\omega_b$, and the commanded orientation is b. After this time, the trajectory continues toward the next target frame, $F_{i+1}$, at the constant angular velocity of $\omega_b$. To avoid faceted motion through the blend, the normalized time must be incremented in infinitesimal intervals.

In reference [13], the formulation of this blending scheme is presented with respect to frame a, not o. This alternate representation can be seen by starting with Equation (36), and utilizing the identity.

$$^\omega R_o \,^o R_\alpha = ^\omega R_a \,^a R_o \,^o R_\alpha \quad (38)$$

$$= ^\omega R_a \,^a R_o \,[\omega_a \tau]^o R_\alpha \quad (39)$$

$$= ^\omega R_a \,^o R_a \,[-\omega_a \tau]^o R_\alpha \quad (40)$$

we have:

$$^\omega R(s) = ^\omega R_o \,^o R_a \,[\omega_a 2\tau(s-f(s))]^a R_b \,[\omega_b 2\tau f(s)] \quad (41)$$

$$= ^\omega R_a \,^o R_a \,[-\omega_a \tau] \,^o R_a \,[\omega_a 2\tau(s-f(s))] \,^a R_b \,[\omega_b 2\tau f(s)] \quad (42)$$

$$= ^\omega R_a \,^o R_a \,[\omega_a 2\tau(s-f(s)-\tfrac{1}{2})] \,^a R_b \,[\omega_b 2\tau f(s)] \quad (43)$$

Further, reference [13] only considers the linear blend case with $f(s) = \tfrac{1}{2} s^2$. This gives:

$$^\omega R(s) = ^\omega R_a \,^o R_a \,[-\omega_a \tau(1-s)^2] \,^a R_b \,[\omega_b \tau s^2] \quad (44)$$

Substituting Equations (4), (14), and (15) yields:

$$^\omega R(t) = \quad (45)$$

$$^\omega R_a \,^\omega R_a \left[ k_a, \frac{(\tau - (t-t_a))^2}{4\tau T_a} \phi_a \right] \,^o R_a \left[ k_b, \frac{(\tau + (t-t_a))^2}{4\tau T_b} \phi_b \right]$$

This is the form of the rotation blend presented in [13].

Figure 5B:
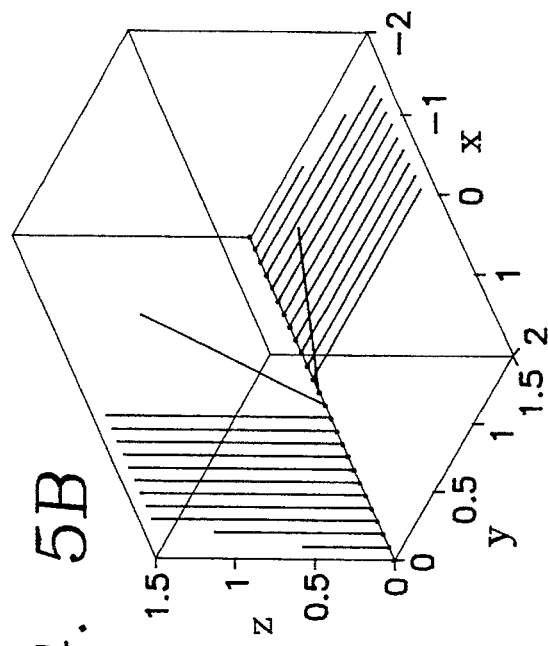
FIGS. 5A and 5B are diagrams depicting the spatial transition of the target frame (FIG. 5A) and the angular velocity vector (FIG. 5B) during an orientation blend using the process of Equation 36 with linear blending.
Figure 5A:
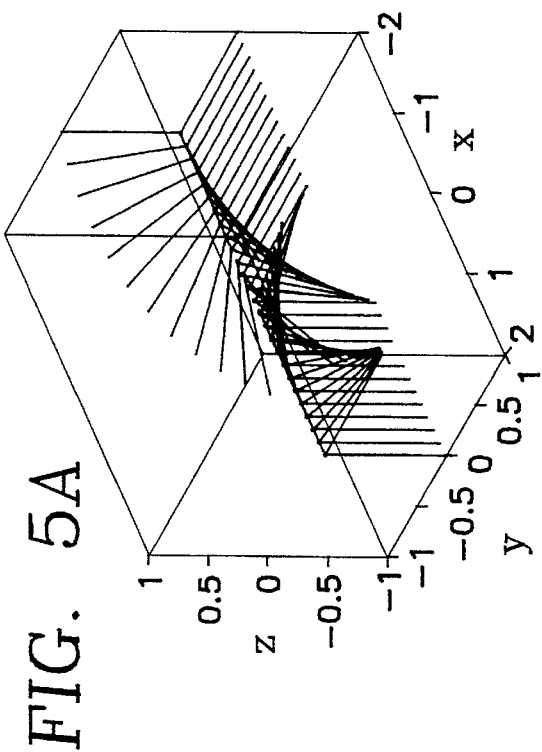
Figure 6C:
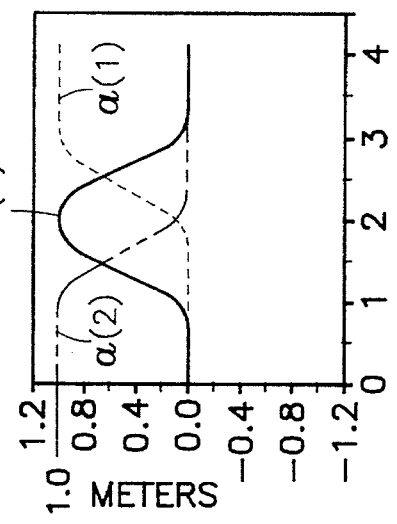
FIGS. 6A, 6B and 6C are graphs illustrating the component values of the unit vectors of the frames shown in FIG. 5A for the n, o and α components, respectively.
Figure 6B:
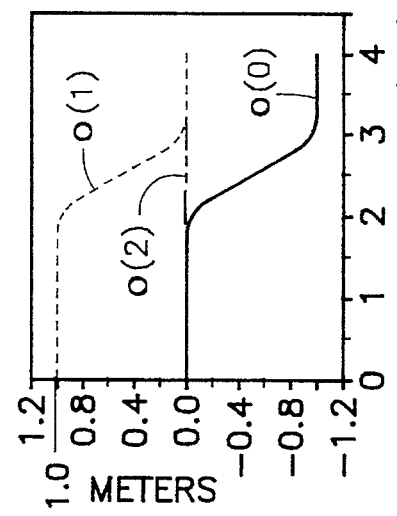
Figure 6A:
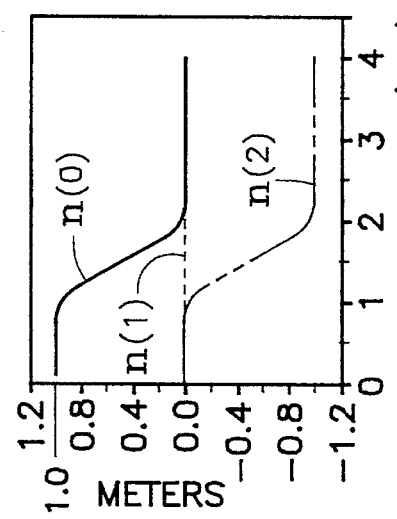

The diagrams of FIG. 5 provide a graphical depiction of change in the target frame (FIG. 5A) and the direction of the angular velocity vector (FIG. 5B). (A constant spatial velocity has also be used, to spread out the vectors for pictorial clarity.) The graphs of FIG. 6 show the change in the target frame basis vector components under this transformation.

5.2 Incremental Rotation Blend Components

Figure 7:
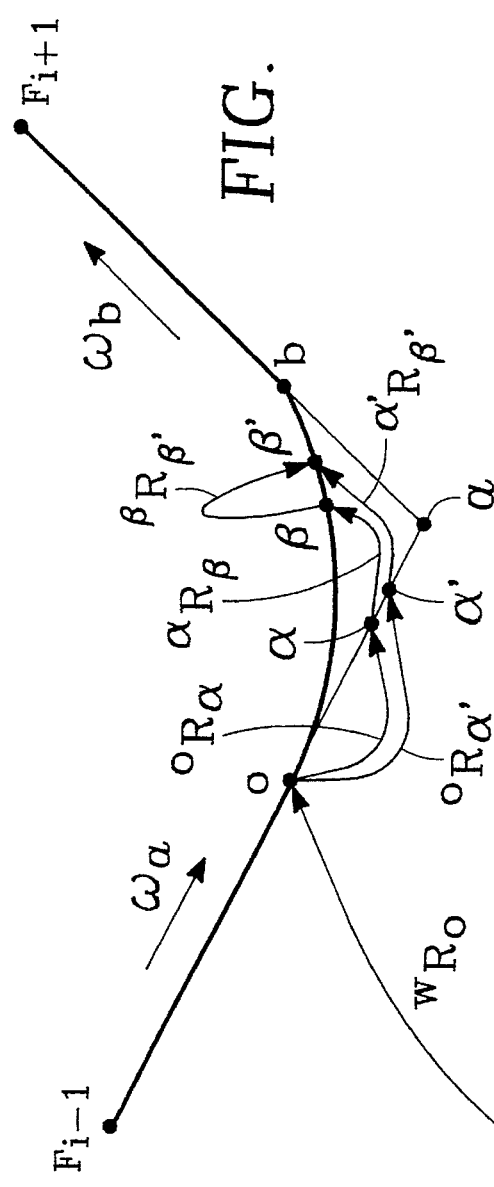
FIG. 7 is a graph depicting the incremental blending of the process of Equation 47.

It is informative to look at the rotations that represent the individual incremental rotation between successive time increments when utilizing Equation (36). Consider the difference between successive frames depicted in FIG. 7.

The incremental rotation between successive orientations is:

$$^\omega R_\beta = ^\omega R_{\beta'} \,^{\beta'} R_\beta \quad (46)$$

$$^\beta R_{\beta'} = ^\omega R^{-1}_\beta \,^\omega R_{\beta'} \quad (47)$$

$$= ^\alpha R^{-1}_\beta \,^o R^{-1}_\alpha \,^\omega R^{-1}_o \,^\omega R_o \,^o R_{\alpha'} \,^{\alpha'} R_{\beta'} \quad (48)$$

$$= ^\alpha R^{-1}_\beta \,^o R^{-1}_\alpha \,^o R_{\alpha'} \,^{\alpha'} R_{\beta'} \quad (49)$$

$$\approx ^\alpha R^{-1}_\beta (1 + ^{\alpha}\epsilon_{\alpha'}) \,^{\alpha'} R_{\beta'} \quad (50)$$

$$\approx ^\alpha R^{-1}_\beta \,^{\alpha'} R_{\beta'} + ^\alpha R^{-1}_\beta \,^\alpha\epsilon_{\alpha'} \,^{\alpha'} R_{\beta'} \quad (51)$$

$$\approx (1 + ^\beta\epsilon_{\beta'}) + ^\alpha R^{-1}_\beta \,^\alpha\epsilon_{\alpha'} \,^{\alpha'} R_{\beta'} \quad (52)$$

$$\approx 1 + ^\beta\epsilon_{\beta'} + ^\beta\epsilon_{\alpha'} \quad (53)$$

$$\approx ^\beta R[\epsilon_{\beta'} + \epsilon_{\alpha'}] \quad (54)$$

$$\approx ^\beta R[\omega_b(s_\beta)\Delta s + \omega_a(s_\beta)\Delta s] \quad (55)$$

$$\approx^\beta R[\omega(s_\beta)\Delta s] \quad (56)$$

where $\epsilon$ is the infinitesimal rotation operator [4]. This result indicates each incremental rotation of Taylor's scheme is equal, to first order, to the rotation provided by the instantaneous angular velocity. This implies that it is possible to blend the angular velocities utilizing Equation (17), and obtain the incremental rotations from the value of the instantaneous angular velocity.

5.3 Angular Velocity Blending for Orientation

Figure 8:
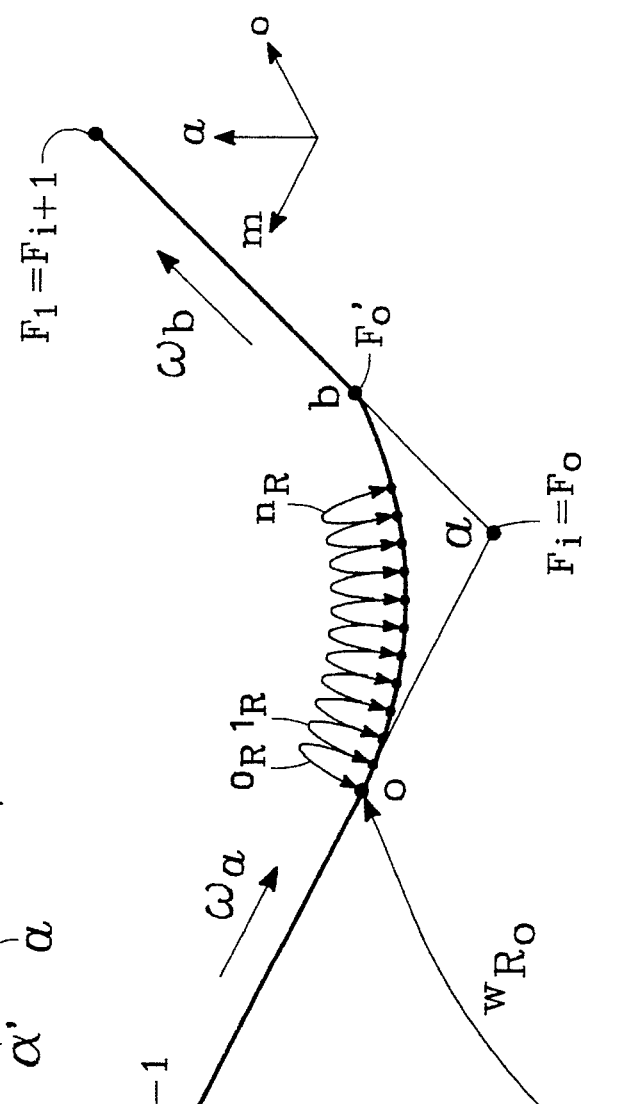
FIG. 8 is a graph depicting the blending of the process of Equation 57 in accordance with the present invention.

As was discussed in the last section, the incremental rotations of an orientation blend may be approximated by utilizing the instantaneous angular velocity provided by Equation (17). Thus, the orientation of the target frame can be computed by utilizing Equations (1), (4), (7), (11), and (17):

$$^\omega R(s_m) = {^\omega R_o} \prod_{n=0}^{m} {^n R[\omega(s_n)\Delta s]} \quad (57)$$

$$s_n = n/N, \Delta s = 1/N$$

where N is the total number of steps for the complete blend. FIG. 8 provides a graphical depiction of this blending method. Before the blend, there is motion away from the orientation of the previous frame, $F_{i-1}$, and toward the intermediate orientation, $\alpha=F_i$. The constant angular velocity before the blend is $\omega_a$. The blend begins at orientation o. For each interval after o, a rotation is constructed and applied according to the angular velocity blending provided by Equation (17). After the normalized blend time s has become unity, the commanded angular velocity will be $\omega_b$. Ideally, the blend will be complete at the desired orientation, o, where the trajectory continues toward the next target frame, $F_{i+1}$.

In practice, velocity-based blending can provide equivalent blends to the rotation matrix method described previously. The graphs of FIG. 9 depict the change in the target frame (FIG. 9A) and the direction of the angular velocity vector (FIG. 9B) for third order polynomial angular velocity blending, with $|a|_{max}=10$ m/s$^2$. A constant linear velocity is also utilized to spread out the origins of the frames for clarity. The graphs of FIG. 10 show the change in the target frame basis vector components under this transformation. Comparing FIGS. 9 and 10 with FIGS. 5 and 6, it is seen that there is little difference between blending schemes, even when using different blending profiles.

5.4 Compensation for Second Order Error from Angular Velocity Blending

Looking closely at FIG. 10, it can be seen that there is some small residual error in the components of the basis vectors. This error results from the second order error introduced by the infinitesimal rotation approximation in Section 5.2. This can be understood by considering how the angular velocity blending effects the rotation blending. Consider first the case of total completion of rotation by $\omega_a$, before rotation by $\omega_b$ begins. In this case, the resulting rotation is exact:

$$^o R_b = {^o R_a[\omega_a \tau]}\, {^a R_b[\omega_b \tau]} \quad (58)$$

$$= {^o R^1_a}\, {^o R^2_a} \cdots {^o R^{N-1}_a}\, {^o R^N_a}\, {^a R^1_b}\, {^a R^2_b} \cdots {^a R^{N-1}_b}\, {^a R^N_b} \quad (59)$$

where the rotations $^o R_a$ and $^a R_b$ have been divided into N parts. Blending the angular velocities is equivalent to changing the order of some of the rotations at the center of this chain. For instance, utilizing the infinitesimal rotation approximation [4]:

$$^o R_b \approx {^o R^1_a} \cdots {^o R^{N-1}_a}\, (1 + {^o \epsilon_a^N})(1 + {^a \epsilon_b^1})\, {^a R^2_b} \cdots {^a R^N_b} \quad (60)$$

$$\approx {^o R^1_a} \cdots {^o R^{N-1}_a}\, (1 + {^a \epsilon_b^1})(1 + {^o \epsilon_a^N})\, {^a R^2_b} \cdots {^a R^N_b} \quad (61)$$

This commutation of the infinitesimal rotations may be continued until the proper sequence is attained. However, second order errors arise from the initial approximation of $R \approx (1+\epsilon)$ and from the disregard of the commutator (the difference between the sequence of the rotations):

$$[1+\epsilon_A, 1+\epsilon_B] = 2\epsilon_A \epsilon_B - 2\epsilon_B \epsilon_A \quad (62)$$

The lack of these second order terms explains the small error introduced by angular velocity based orientation blending.

The change in position of $^o R_a^i$ and $^a R_b^j$ operators in the sequence is reminiscent of diffusion. As the $^o R_a^i$ 'diffuse' farther to the right, and the $^a R_b^j$ 'diffuse' farther to the left, the changed in orientation becomes more blended. Since the infinitesimal rotations can be represented by their angular velocity equivalents, the diffusion profile is equivalent to the velocity blend profile. For instance, the shape of the cycloidal blend profile in FIG. 2B indicates more diffusion than the linear one. Further smaller values of $|a|_{max}$ also imply more diffusion, since they spread out these curves. More diffusion introduces second order error. Therefore, linear blends and high acceleration blends result in less residual error for a given value of $|a|_{max}$. However, linear blends will result in more error if the blend time is fixed instead of the acceleration. This can be understood by lessening the slope of the linear blend line in FIG. 2B, thus introducing more diffusion.

To provide some quantitative description to this discussion, the following table shows the magnitude of the orientation error for the example previously considered.

| blend type | $|a|_{max} = 10$ m/s$^2$ | $|a|_{max} = 5$ m/s$^2$ |
| --- | --- | --- |
| linear | 0.29° | 1.16° |
| O(3) polynomial | 0.39° | 1.56° |
| cycloidal | 0.41° | 1.62° |

It is apparent that these errors are small and may be corrected (as described below). Substantially larger errors are not possible since they would require much smaller accelerations which require longer blend times. Too large of a blend time multiplied by $\omega_a$ or $\omega_b$ would indicate a rotation greater than 180° in the initial or final legs. Such large rotations have been precluded by Equation (5).

While this small error introduced by one blend does not necessarily require compensation, the summation of this error over successive blends may become significant. To compensate for the residual error, we propose the use of a correction term which is calculated at the end of every velocity based blend of orientation. This term is the incremental rotation from the resultant frame to the desired frame at the end of the orientation blend:

$$R[k_{cor}, \,_{cor}] = (^\omega R_a \, {^a R_b[\omega_a \tau]})^{-1}\, ^\omega R[s_N = 1] \quad (63)$$

In practice, $k_{cor}$ and $_{cor}$ can be easily calculated by Equations (5) and (6). A correction velocity may then be calculated and applied to the leg of the trajectory being entered, for the time specified to the next via frame:

$$\omega_{cor} = k_{cor\ cor}/(T_{i+1}-\tau_i) \tag{64}$$

This correction term is modified by a gain, $K_{cor}$, and added to the angular velocity $\omega_b$. (Since it is very small in magnitude, concerns about changing the value of $\omega_b$ have been ignored.) The gain is needed to maintain stability in what is effectively a low bandwidth feedback controller. If Equations (57) and (63) were linear, this discreet time controller would be trajectory stable for $0 \leq K_{cor} \leq 1$. However, for the nonlinear orientation blending, we have empirically found stability for gains of $0 \leq K_{cor} \leq 0.3$.

6 Implementation Considerations

Three main implementational considerations have been accommodated in our scheme: maximum acceleration, minimum blend time, and velocity summation.

6.1 Maximum Acceleration

Since the calculated trajectories are to be executed by real manipulators, the commanded acceleration must be limited to what is achievable. Further, the achievable task space acceleration of the arm depends on the configuration of the robot arm. In different parts of the workspace, different task space accelerations are possible. Therefore, two possibilities exist: 1.) limit all task space accelerations to the worst case acceleration of the arm, or 2.) create a complete map of the achievable task space accelerations, and limit the trajectory blending accordingly. However, creating and accessing such a map is anticipated to be very cumbersome. Therefore, we have currently chosen to work with the first, and simpler, of these two options.

Another consequence of limited acceleration is that it erodes the straight line leg segments of the trajectory between via frames. For a small enough acceleration, one blend will end as another begins. For accelerations smaller than this, one blend would have to begin before another ends. We do not permit this to occur. In this case, the acceleration is increased level of acceleration is not achievable by the arm, then the via frames are not reasonably selected and unavoidable position errors will occur.

6.2 Minimum Blend Time

Due to the discrete nature of the computer implementation of these algorithms, it is necessary to specify a minimum number of iterations over which an acceleration is specified. From Equation (b 20) this quantity is the minimum allowed value of $2\tau$. If a minimum is not specified, the calculated blend time may become comparable to the algorithm cycle time. Thus, the calculated velocity and position will be discontinuous, providing poor input to the arm controller. We have empirically determined and utilized a minimum value of twenty iterations per blend. A direct consequence of this specification of $2\tau_{min}$ is that the maximum allowed acceleration is also limited. If more acceleration is desired, and the manipulator is capable of it, then $2\tau_{min}$ should be reduced. However, to keep the same number of iterations per blend with a reduced $2\tau_{min}$, the algorithm rate must be increased proportionally.

6.3 Velocity Summation

Figure 11:
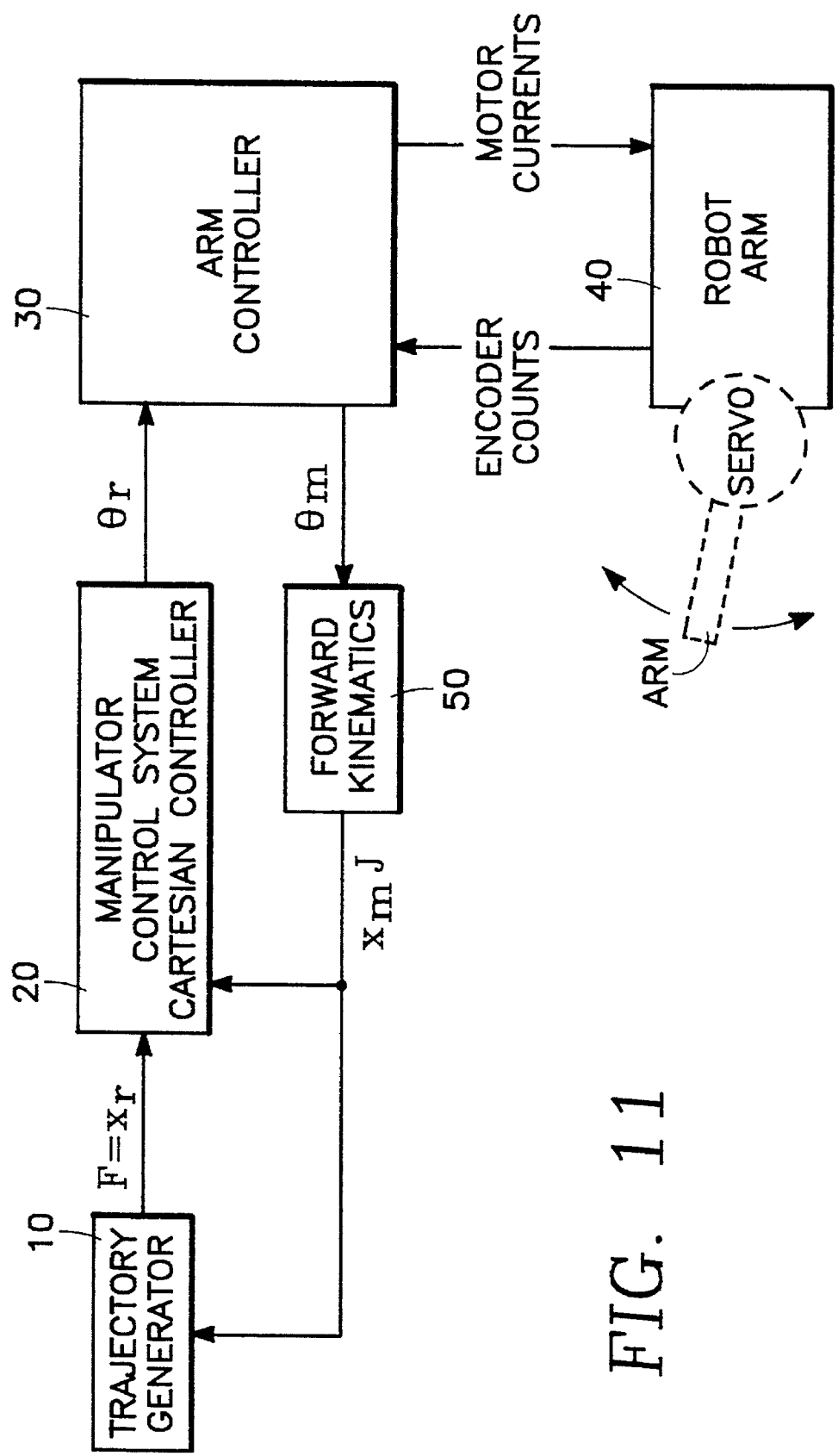
FIG. 11 is a simplified schematic block diagram of a robot control system employed in carrying out the invention.

To be able to modify commanded trajectories with other control inputs, the commanded variable must be a velocity (a generalized flow variable), not a position [11]. FIG. 11 shows a system for implementing one embodiment of the invention. Although not shown in the drawing, the trajectory generator optionally may be subject to modification by the input of a joystick or a proximity sensor monitor process. In FIG. 11, a trajectory generator 10 performs the velocity blending process described above to produce a desired sequence of desired end effector frames or positions. These are output to a manipulator control system Cartesian controller 20. The controller 20 computes and outputs a command angle $\theta_c$ to a robot arm controller 30 (in this case, the arm controller for the Robotics Research K-1207 Arm). The arm controller 30 converts the command angle to motor currents and outputs the motor currents to servoes in a robot arm 40 (in this case, a Robotics Research K-1207 Arm). The robot arm 40 returns servo encoder counts to the arm controller 30, which computes therefrom and outputs corresponding angle measurements $\theta_m$ to a forward kinematics processor 50. The forward kinematics processor 50 computes and outputs a corresponding measured frame $F_{meas} = x_m$ to the trajectory generator 10 and computes and outputs a Jacobian transformation matrix J to the manipulator controller 20. The Cartesian controller 20 and the forward kinematics processor 50 perform the foregoing operations and computations using conventional techniques well known in the art. The arm controller 30 and the robotics arm 40 are commercially available devices.

Utilizing the velocity blending scheme described in this specification with reference to Equation 57, velocity output is obtained directly. Alternatively, if analytic integration of position is used (as in Equation (32)), or if rotation matrix orientation blending is used (as in Equation (36)), then the velocity must be obtained by differencing the reference frames. As will be seen in the next section, this requires extra computation not needed with a purely velocity based scheme.

7 Computational Costs

Table I provides an outline of the computational steps and costs for both position-based and velocity-based blending. The equations involved in each step are also summarized. Finally, an estimate of the computational complexity is given by stating the number of additions, subtractions, multiplies, and divides required, as well as the trigonometric (and square root) operations needed.

Under the operations column, the values are the number of standard math operations (+−*/) and the number of trigonometric and other math operations (e.g., sin, cos, sqrt, and so forth). The top section of the table reviews some common steps needed for both schemes. Of these, the frame differencing and frame incrementing are very costly. The calculation of $f(s)$ or $f'(s)$ is variable since it depends on the blend functions chosen.

The second and third sections of the table show the algorithmic differences between the position/orientation blending and the velocity blending methods. The most striking difference between the two formulations is the reduced computational cost of the velocity blending method. During a blend it requires only 12 operations, while the position/orientation method requires 263 operations plus eight costly trig or square root calls. The situation is much the same during the straight line leg segments of the trajectory, where the velocity based scheme requires zero operations, while a completely position based scheme requires 160 plus 5. The efficiency of the velocity based scheme is paid for by the overhead necessary during the transition from blend to leg segments. At this juncture, the velocity scheme must make 207 plus 6 operations, while the position/orientation scheme requires only 69 plus 2. However, this overhead occurs only once for each via frame, compared to the hundred or thousands of iterations that occur for the blend or leg segment

TABLE I

| Algorithm Step | Eqns | Ops |
|---|---|---|
| Common | | |
| $v\Delta t = \text{framedif}(F_1,F_2) = D()$ | 1–6, 11 | 69, 2 |
| $F_2 = \text{frameinc}(F_1,v\Delta t) = I()$ | 1–4, 7–11 | 91, 3 |
| calc $f(s)$ or $f'(s)$ | 17, 32, 36 | variable |
| $v_2 = \text{vecscale}(v_1,\text{func}) = S()$ | 11 | 7, 0 |
| $a < |a|_{max}, \tau > \tau_{min}$ | 20 | variable |
| Position/Orientation Blending Method | | |
| blend | | |
| calc $f(s)$ | 33, 35, 34 | variable |
| $v_\alpha = S(v_a, s - f(s))$ | 36 | 6 |
| $v_\beta = S(v_b, f(s))$ | 36 | 6 |
| $F_a = I(F_o, v_\alpha \Delta t)$ | 36 | 91, 3 |
| $F_b = I(F_a, v_\beta \Delta t)$ | 36 | 91, 3 |
| $v = D(F_o, F_b)/\Delta t_{ob}$ | 1–6, 11 | 69, 2 |
| leg | | |
| $F(t) = I(F_i, \{p(t), k\phi(t), \psi(t)\})$ | 1–4, 7–11 | 91, 3 |
| $v = D(F(t), F(t - \Delta t))/\Delta t$ | 1–6, 11 | 69, 2 |
| transition | | |
| $v_b = D(F_i, F_{i+1})/T_{i+1}$ | 1–6, 11 | 69, 2 |
| $a < |a|_{max}, \tau > \tau_{min}$ | 20 | variable |
| Velocity Blending Method | | |
| blend | | |
| calc $f(s)$ | 21, 27, 24 | variable |
| $v = S(v_a, 1 - f(s))$ | 17 | 6 |
| $v + = S(v_b, f(s))$ | 17 | 6 |
| leg | | |
| nothing, constant $v = v_a$ | | 0, 0 |
| transition | | |
| $v_b = D(F_i, F_{i+1})/T_{i+1}$ | 1–6, 11 | 69, 2 |
| $F'_b = I(F_1, v_b \tau_i)$ | 63, 64 | 69, 2 |
| $v_b + = D(F_b, F'_b)/T_{i+1} - \tau_i)$ | 63, 64 | 69, 2 |
| $a < |a|_{max}, \tau > \tau_{min}$ | 20 | variable | computations. Obviously, velocity blending introduces a significant computational savings.

It is important to note that some of the computational advantage of velocity blending is introduced by the assumption that the output of a trajectory generator must be a velocity. The position/orientation scheme must utilize a velocity calculation step during the blend and leg segments which costs 69 plus 2 operations. However, even without this step the velocity blending method is significantly faster. Further, it was shown in the last section why velocity output is more useful.

One other computational burden is introduced to the position/orientation method by the assumption that position, $[p, k\phi, \psi]$, is specified as a function of time during the leg segment. Alternatively, the leg segment velocity could be precomputed and utilized directly as in the velocity blend method. Since k is constant during the leg segment, no errors would be introduced. Also, the leg velocity must be computed anyway if the maximum acceleration checks are to be performed (as is assumed).

8 Implementation

We have implemented this algorithm on an SGI Iris workstation for simulation, and on a VME based 68020 microprocessor for control of 7 DOF Robotics Research K-1207 Arm. The end-effector of the robot arm carries an array of sensors: two CCD cameras, two proximity sensors, an optical pyrometer, a gas sensor, and a force sensor. The addition of eddy-current and contact acoustic sensors are planned. While our frame to frame motions are designed to aid inspection by these devices, the presented technique is obviously extensible to motion required for purposes other than inspection.

8.1 Experimentation

The blending algorithm has also been implemented for real-time control on a 12.5 MHz Heurikon 68020 processor. For the tests, a trajectory similar to the simulation trajectory has been executed. However, since the robot base position is fixed, the size of the inspection area is restricted. A total of twelve via frames are used to scan a rectangular shape about half as large as that in the simulation. Linear blending was arbitrarily chosen for these tests. During experiments the minimum time between frames is 3 seconds. The real-time process runs at 44 Hz, or ≈22.7 ms, giving approximately 132 iterations for each frame to frame motion. (The control rate is governed by other control software, not the processing requirements of the trajectory blending algorithm, which we have shown to be quite minimal.) The position gain was $K_p=20$, and the trajectory correction gain was $K_{cor}=0.3$. The minimum blend time was $2\tau_{min}=20$ iterations, or about a half second. The maximum acceleration was $|a|_{max}=10$ m/s$^2$.

9 Angular Velocity Blending Processing Description

Figure 12:
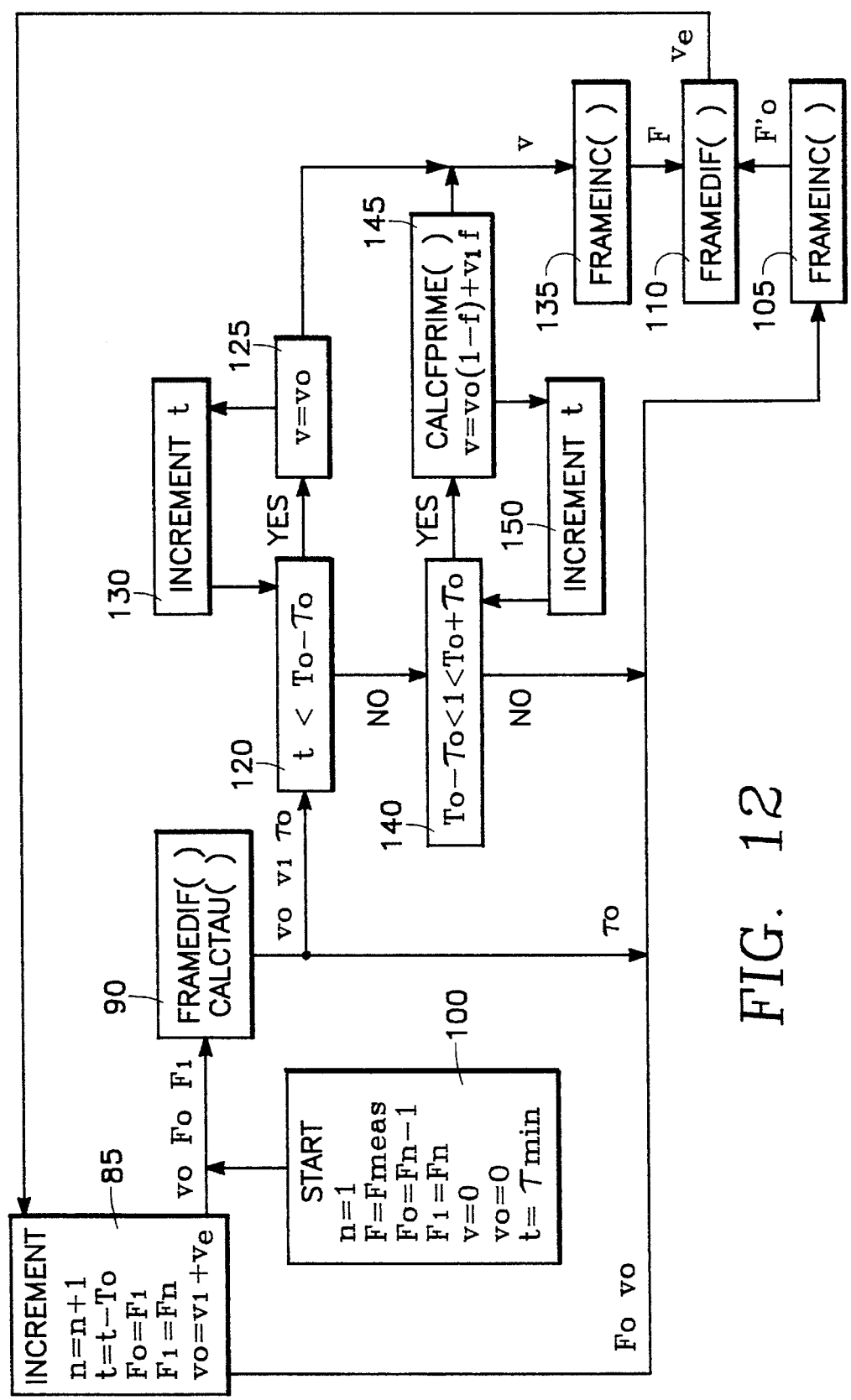
FIG. 12 is a block flow diagram illustrating the blending process of the present invention in accordance with a preferred embodiment.

The angular velocity blending method described above is now described in greater detail with reference to the steps depicted in FIG. 12.

The process begins by initializing key parameters (block 100 of FIG. 12), by setting the index n to one, setting the current global velocity v an the initial velocity $v_0$ to zero, while setting the current frame F to the measured frame of reference $F_{meas}$ and setting the current time t to the minimum blend time $\tau_{min}$. The previous frame corresponds to $F_{i-1}$ of the graph of FIG. 8.

Typically, the user specifies the next target frame $F_0$ corresponding to $F_i$ or point a of FIG. 8, the subsequent frame $F_1$ corresponding to $F_{i+1}$ of FIG. 8. As a slight departure from the notation employed in FIG. 8, the process illustrated in FIG. 12 employs the index n to keep track of the successive frames, and the next target frame $F_0$ is set to $F_{n-1}$ while the subsequent frame $F_1$ is set to $F_n$.

The description of this process will now skip to a point at which blending has been completed for a current frame, so that the index n is to be incremented by one: n=n+1. This incrementing of the index n is performed as part of an increment step of block 85, which begins a new iteration of the cyclic process. In the increment step of block 85, the current time is shifted by $T_0$, the current target frame $F_0$ is updated to the subsequent frame $F_1$ of the previous iteration and the current target frame $F_1$ is set to the next frame $F_n$ specified by the user. The global velocity v includes both the linear velocity v and the angular velocity ω, in accordance with Equation 11. In the increment step of block 85, the initial block velocity $v_0$ is corrected by an error correction global velocity $v_e$ computed in an other part of the process in accordance with Equation 65 in a manner described below herein. As will be described, the purpose of this correction is to compensate for a residual error at point b of FIG. 8 corresponding to a blend exit frame $F'_0$, specifically the residual error discussed with reference to Equation 63.

Next, a differentiation step of block 90 is performed using a computation described below called framedif to compute a global velocity $v_1$ necessary to move from frame $F_0$ to frame $F_1$ within a time $T_1$ specified by the user. The step of block 90 then computes from the two global velocities $v_1$ and $v_0$, and from a maximum acceleration specified by the user, a blend interval time $\tau_0$ in accordance with Equation 23, 26 or 29 using a process calctau described later in this specification.

At a decision block 120, a determination is made whether the blend time $t=T_0-\tau_0$ has been reached. If not (YES branch of block 120), then the current global velocity v is kept constant at $v_0$ (block 125) and the time t is incremented by adding to it a time differential $\delta t$ (block 130).

A frame incrementing step 135 is performed using the current angular velocity $\omega$ of the current global velocity v. This frame incrementing step 135 is a rotation of the manipulator though an incremental angle equal to $\omega \times \delta t$. The frame incrementing step of block 135 updates the current frame F. The process then cycles back to the determination step of block 120 and continues in a cycle constituting the steps of blocks 120, 125, 130 and 135. This cycle is repeated until the time t reaches the blend time $t=T_0-\tau_0$ (NO branch of block 120).

Once the blend time has been reached, a determination is made at a decision block 140 whether the current time t falls within the blend time window $T_0-\tau_0<t<T_0+\tau_0$. If so (YES branch of block 140), then the blend function $f'(t,s)$ is computed (block 145) according to Equation 33, 34 or 35 and this function is used to update the current blended global velocity v using Equation 16. The current time is incremented in the step of block 150 as in the step of block 130. The frame incrementing step of block 135 is performed, but this time using the current angular velocity $\omega$ of the global velocity v blended between $v_0$ and $v_1$ in accordance with Equation 16 by the step of block 145. The process cycles back to the determination step of block 140. A cycle constituting blocks 140, 145, 150 and 135 is repeated until the time t exceeds the blend period (NO branch of block 140). Each iteration of this cycle produces an incremental rotation of the frame using an angular velocity vector $\omega$ updated each iteration.

Upon completion of this cycle (i.e., when $t>T_0+\tau_0$), a sequence of incremental rotations has been performed as depicted in FIG. 8 to blend the manipulator motion from the initial frame $F_0$ to the blend exit frame $F'_0$. With each iteration of the process after each time increment $\delta t$, the frame increment step of block 135 computes an updated frame F, which is output by the trajectory generator 10 of FIG. 11 to the manipulator control system cartesian controller 20 of FIG. 11 to produce a command $\theta_r$ to the robot servos to rotate and/or translate the robot manipulator to the updated frame.

Taking the NO branch of block 140, the current frame F is compared to the desired blend exit frame $F'_0$ (corresponding to point b of FIG. 8) obtained from a frame incrementing step 105. The frame incrementing step is an incremental rotation through an angle obtained by multiplying the initial angular velocity $\omega_0$ by half the blend time, $\tau_0$, obtained from the step of block 90. (Both frame incrementing steps 105 and 135 employ a process called frameinc which is described later in this specification.)

Then, a differentiation step 110 computes a velocity error correction $v_e$ by dividing the difference between the current frame F and the desired blend exit frame $F'_0$ by the time remaining to the next frame, $T_0-\tau_0$. The incrementing step of block 85 is repeated, and the entire process begins the next iteration with a new target frame $F_{n+2}$. The adding step $v_0=v_0 v_e$ of block 85 compensates for the residual error of the previous blend cycle and implements the correction of Equation 65. (The differentiation steps of both blocks 90 and 110 employ a process called framedif defined later in this specification.)

The foregoing process is now set forth in greater detail as a series of program language statements, each statement being accompanied by an explanatory remark in italics. In the following, there is a main program, called main body which calls for four different sub-routines named, respectively, frameinc, framedif, calctau and calcfprime.

9.1 Main Body

```
BEGIN:
n = 0          initialize counter
F = F_meas     initialize desired to current frame
F_0 = { R_0,p_0,ψ_0,T_0 }   next target frame
v = 0          start at rest
v_0 = 0        initial velocity is zero
v_e = 0        initial error correction velocity is zero
t = τ_min      initialize time
    NEXT:
v_0 = v_0 + v_e   modify target velocity
n = n + 1      increment counter
F_1 = F_n = { R_n,p_n,ψ_n,T_n }   subsequent frame (if unavailable
               set to F_(n-1))
V_1 = framedif (F_0,F_1)/T_1   determine average velocity
               needed between frames
τ_0 = calctau(v_1 − v_0)   calculate and shift blend time
               while(t < T_0 + τ_0){
t = t + δt     increment time
LEG:
if(t < T_0 − τ_0) v = v_0   constant velocity in leg
BLEND:
if(T_0 − τ_0 < t < T_0 + τ_0){
f' = calcfprime((t − T_0 + τ_0)/2τ_0)   get blend function
               value
v = v_0(1 − f') + v_1 f'   calculate blended velocity
}
F = frameinc(F,vδt)   increment the desired frame
}
if(t ≥ T_0 + τ_0){
F'_0 = frameinc(F_0,v_0τ_0)   determine correct frame position
               for blend exit
v_e = framedif(F,F'_0)/(T_0 − τ_0)   determine additional velocity
               needed
t = t − T_0    shift time
F_0 = F_1      shift frames
v_0 = v_1      shift velocity value
goto NEXT:     repeat the process
}
```

9.2 Frame Differencing Subroutine framedif($F_0,F_1$)   frame differencing subroutine
{
    $v = (p_1 - p_0)$   linear velocity assuming unit time $$k\sin\phi = \frac{1}{2}(n_0 \times n_1 + o_0 \times o_1 + a_0 \times a_1)$$

$$\cos\phi = \frac{1}{2}(n_0 \cdot n_1 + o_0 \cdot o_1 + a_0 \cdot a_1 - 1)$$

if(|k sinφ| = 0) {   ambiguous result
   if(cosφ = 1) φ = 0   no difference in frames
   if(cosφ = −1) {   greatest difference in frames
      φ = π

$$k_x = \sqrt{(n_x + 1)/2}$$

if $k_x(n_x) = 0$, substitute $o_x,o_y,o_z$ $k_y = n_y/2k_x$   if $k_x(o_x) = 0$, substitute $a_x, a_y, a_z$
      $k_z = n_z/2k_x$
   }
}
if(|k sinφ| ≠ 0) φ = $\tan^{-1}$(sinφ, cosφ)   minimum angle between frames $$\omega = \frac{k\sin\phi}{|k\sin\phi|}\phi$$

angular velocity assuming unit time $\psi = (\psi_1 - \psi_0)$   scalar velocity assuming unit time -continued

```
    return( [v, ω, ψ])    return frame difference
}
```

9.3 Frame Incrementing Subroutine

```
frameinc(F₀,v₀t₀)    frame incrementing subroutine
{
    φ = |ω₀t₀|    rotation angle
    k = ω₀t₀/φ    rotation axis
    S_φ = sinφ
    C_φ = cosφ
    V_φ = 1 − cosφ
```

$$\mathcal{R} = \begin{bmatrix} k_x k_x V_\phi + C_\phi & k_x k_y V_\phi - k_z S_\phi & k_x k_z V_\phi + k_y S_\phi \\ k_x k_y V_\phi + k_z S_\phi & k_y k_y V_\phi + C_\phi & k_y k_z V_\phi - k_x S_\phi \\ k_x k_z V_\phi - k_y S_\phi & k_y k_z V_\phi + k_x S_\phi & k_z k_z V_\phi + C_\phi \end{bmatrix}$$

```
    rotation matrix
    ℛ₁ = ℛ ℛ₀    increment orientation
    p₁ = p₀ + v₀t₀    increment position
    ψ₁ = ψ₀ + ψ₀t₀    increment scalar
    return(F₁ = { ℛ₁,p₁,ψ₁,T₀ + t₀} )    return the new
frame
}
```

9.4 Calculation of Blend Time Subroutine

```
calctau(Δv)
{
    if(LINEAR)    return(Δv/2|a|_max)    linear blending
    if(O3POLY)    return (3Δv/4|a|_max)    third order
polynomial blending
    if(CYCLOID)    return(πΔv/4|a|_max)    cycloidal
blending
}
```

9.5 Calculation of Blend Profile Subroutine

```
calcfprime(s)    s is normalized time
{
    if(LINEAR)    return(s)    linear blending
    if(O3POLY)    return(−2s³ + 3s²)    third order
polynomial blending
```
$$\text{if(CYCLOID) return} \left( \sin^2 \frac{\pi}{2} s \right) \text{ cycloidal blending}$$
```
}
```

10 Conclusion

This specification has presented a new formulation of trajectory generated based on velocity blending. First, a new formulation for trajectory blending was provided, allowing for the direct comparison and utilization of numerous blend functions. Then, a generalized version of the previously proposed orientation matrix blending formulation was reviewed. It was shown how a first order approximation of this scheme leads directly to angular velocity blending for orientation change. Further, the residual error incurred was explained, quantized, and compensated. Also explained were implementational considerations such as acceleration limits, velocity summation requirements, algorithm computation rates and complexity. Finally, the results of implementation of this scheme in both simulation and real-time experimentation were graphically presented. Both the analysis and implementation has shown that the speed and simplicity of the velocity-blending formulation enable its ease of use for real-time manipulator trajectory generation.

Appendix A contains a listing of a C-language computer code employed in carrying out the invention. Each of the key statements in the listing is accompanied by an explanatory remark in italics.

-36-

11 APPENDIX A: C-Code Listings

11.1 Via.c

```
/* via_socket.c:  trajectory generator reading points form socket
queue * include<stdio.h>
include<signal.h>
#include<math.h>
#include<cmu.h>
#include<strings.h>
#include<macros.h>
#include"via.h"

Frame_t Via[] = {
  {
    { 1.0, 0.0, 0.0},
    { 0.0, 1.0, 0.0},
    { 0.0, 0.0, 1.0},
    {-1.0, 1.0, 1.0}, -HALFPI, HALFPI, 1.0}
  ,{
    { 0.0, 1.0, 0.0},
    {-1.0, 0.0, 0.0},
    { 0.0, 0.0, 1.0},
    { 0.0, 0.0, 0.0}, -HALFPI, HALFPI, 1.0}
  ,{
    { 0.0, 0.0,-1.0},
```

-37-

```
    {-1.0, 0.0, 0.0},
    { 0.0, 1.0, 0.0},
    { 1.0, 1.0, 1.0}, -HALFPI, HALFPI, 1.0}
};

#define VIAPTS (int)(sizeof(Via)/sizeof(Frame_t))

char server_hostname[80] = "loren";

FILE *tfp, *pfp, *vfp, *mfp, *ffp;

int Traj_Running = 1;

/**************************************/
/*signal handler*/
endtraj()
{
  Traj_Running = 0;
}

/**************************************/
main()
  {
    char buf[80];
    char prompt[80];
    char ans[80];
    int done = 0;
    int child;
    int vianum = 0;
```

-38-

```
    double basetime = 0.0;

getstr("Hostname of server:", server_hostname,
5   server_hostname);

/*parent*/
    if( !(child=fork()) ){
10      socket_server_init(SOCKPORT);
        while(strncmp(getstr("send via frames?",
    "y",buf),"y",1)==0){
            vianum = 0;
15          while(vianum < VIAPTS){
                PERROR(socket_write( &(Via[vianum++]),
    sizeof(Frame_t)));        }
            printf("done sending via frames...");
20      } kill(child, SIGUSR2);
        exit(0);
25  }
    /*child*/
    else{
        signal(SIGUSR2,endtraj);
30      sleep(2);

/*open files for data logging*/
35      pfp = fopen("p.dat", "w");
        vfp = fopen("v.dat", "w");
        mfp = fopen("m.dat", "w");
```

-39-

```
        tfp = fopen("t.dat", "w");
        ffp = fopen("f.dat", "w");
        printf("pfp = 0x%x, vfp = 0x%x, mfp = 0x%x, tfp =
 5   0x%x, ffp= 0x%x\n",      pfp, vfp, mfp, tfp, ffp);
        socket_client_init(server_hostname,SOCKPORT);
        socket_noblock();
        trajgen();

10
        /*close data files*/
        {int i;
        for(i=VIAPTS-1;i≥0;i--)
15      fprintf(pfp, "%f  %f  %f\n", Via[i].p[0], Via[i].p[1],
     Via[i].p[2]);     }
        fclose(pfp);
        fclose(vfp);
20      fclose(mfp);
        fclose(tfp);
        fclose(ffp);
        }
25   }

30   trajgen()
     {
       Vel_t v, fdel;
       Frame_t via[2];
35     Frame_t f, fnew;
       static int profile = CYCLOIDAL;
```

-40-

```
        static int vfn, vfa, vfb;
        static int inleg = FALSE;
        static int atstart = TRUE;
5       static double t  = 0.0;
        static double ta = 0.0;
        static double tb = 0.0;
        static double tau, twotau;
10      static Vel_t va        = ZEROVEL_T;
        static Vel_t vb        = ZEROVEL_T;
        static Vel_t vbminusva = ZEROVEL_T;
        static Vel_t verror    = ZEROVEL_T;
15      static Vel_t vold      = ZEROVEL_T;
        register double cs, ss;
        register double temp;
        register double s;
20      Vel_t vtemp;
        double vmag;
        int i;
        int j = 0;
25
        static double basetime = 0.0;
            /* needed only for printing nice graphs*/

30      f = Via[2];

/**********/
        /*main loop*/
35      /**********/
        while(Traj_Running){
```

-41-

```
    vfn = 0;
    vfa = 1;
    vfb = 0;
    via[vfb] = f;
    ta = 0.0;
    tb = 0.0;
    inleg = 0;

/*needed only for data logging*/
    fprintf(pfp, "%f  %f  %f\n", via[0].p[0], via[0].p[1],
via[0].p[2]);

socket_normal(); /*cause read to block on empty queue*/
    atstart = TRUE;
    goto START;    /*when starting traj, need to get next
frame,
tau*/

/*************************/
/* trajectory generating time loop    */
/* (start t obtained from tau, at bottom) */
/*************************/
    for(; t <= tb+tau; t += TINC){ s = (t - (ta - tau)) / twotau;

/*************/
```

-42-

```
                    /* if in blend */
                    /**************/
                    if(s≥0.0 && s≤1.0 && vfn>0){
                       inleg = FALSE;
                       switch(profile){
                          case CYCLOIDAL:
                             ss = sin(HALFPI*s);
                             VELSCALE(vbminusva,ss*ss, vtemp);
                             VELADD(va,vtemp,v);
                             break;
                          case LINEAR:
                             VELSCALE(vbminusva,s,vtemp);
                             VELADD(va,vtemp,v);
                             break;
                       }
                    }
                    /************/
                    /* if in leg */
                    /************/
                    else{

/*********************/
                       /* if first step of leg */
                       /*********************/
                       if(!inleg){

/******************************************/
                          /* add in integration error correction term */
                          /******************************************/
```

-43-

```
         VELSCALE(vb,t-TINC-ta,vtemp);
            /*not exactly tau, but close*/
      FRAMEINC(via[vfa],vtemp,fnew);
         FRAMEDIF(fnew,f,vtemp);
         VELSCALE(vtemp,1.0/via[vfb].t,verror);
         VZERO(verror.v);
            /*trans. integration works well*/

/******************/
      /* inchworm values */
      /******************/
  START:   inleg = TRUE;
         va = vb;
         ta = tb;
         vfa = vfb;

/******************************/
      /* is there another via point? */
      /******************************/
         if(socket_read(&via[(vfn+1) & 1], sizeof(Frame_t)) <
  0){        VELZERO(vb);
         }
         else{
            /*frame has been read from socket*/
         socket_noblock();
            /*cause read not to block on empty queue*/
         vfb = (++vfn) & 1;
            FRAMEDIF(via[vfb], via[vfa], vtemp);
            VELSCALE(vtemp, 1.0/via[vfb].t, vtemp);
```

-44-
```
        VELADD(verror,vtemp,vb);
        tb += via[vfb].t;
    }

/**********************/
    /* get tau; check bounds */
    /**********************/
    VELDIF(vb,va,vbminusva);
    VELMAXMAG(vbminusva,temp);
    switch(profile){
      case CYCLOIDAL:
        twotau = HALFPI*temp/AMAX; break;
      case LINEAR:
        twotau =temp/AMAX; break;
    }

/**********************/
    /* check min/max of tau */
    /**********************/
    if(twotau < TWOTAUMIN)   twotau = TWOTAUMIN;
    else if(twotau > via[vfa].t){
        twotau = via[vfa].t;
        printf("TauA > 0.5 tA: Will attempt to exceed
AMAX.\n");          }          else if(twotau > via[vfb].t){
        twotau = via[vfb].t;
        printf("TauB > 0.5 tB: Will attemptto exceed
AMAX.\n");          }          tau = 0.5*twotau;
        if(atstart){
            atstart = FALSE;
```

-45-

```
            basetime += t+tau;  /*needed only for data
logging*/
            t = -1.0*tau;    /*set effective starttime of
  loop*/          }

}/*end if(!inleg)*/ v = va;
      }

/*******************************/
  /* get next pos; trapezoid rule */
  /*******************************/
      VELADD(v,vold,fdel);
      VELSCALE(fdel, 0.5*TINC, fdel);
      FRAMEINC(f,fdel,fnew);
      fnew.t = t;
      f = fnew;
      vold = v;

/*************************************/
      /*needed only for data logging*/
      fprintf(pfp, "%f  %f  %f\n", f.p[0], f.p[1], f.p[2]);
  /*fprintf(pfp, "%f %f \n", f.p[0], f.p[1]); */
      VMAG(v.w,vmag); fprintf(mfp, "%f %f \n", t+basetime,
  vmag);      if(j++ > VINC){
        j=0;

/*print noa frame vectors to file*/
```

-46-

```
        fprintf(ffp, "%f %f %f  %f %f %f \n", f.p[0], f.p[1],
    f.p[2],        f.n[0],f.n[1],f.n[2]);
        fprintf(ffp, "%f %f %f  %f %f %f \n", f.p[0], f.p[1],
    f.p[2],        f.o[0],f.o[1],f.o[2]);
        fprintf(ffp, "%f %f %f  %f %f %f \n", f.p[0], f.p[1],
    f.p[2],        f.a[0],f.a[1],f.a[2]);

/*print angular vel vecs to file*/
        fprintf(vfp, "%f %f %f  %f %f %f \n", f.p[0], f.p[1],
    f.p[2],        v.w[0], v.w[1], v.w[2]);

}
     }
    }
   }
```

-47-

11.2 Via.h

```
/* via.h: trajectory generator include file
 *
 */ define TINC        0.01
define TINCINV     100
#define VINC        10
#define AMAX        10.0
#define TBUF        (100.0*TINC)
#define TWOTAUMIN   (20.0*TINC)
define MAXVIAFRAMES 10 define SOCKPORT 40011 define CYCLOIDAL   0
define LINEAR      1 typedef struct{
  double v[3];
  double w[3];
  double psidot;
  double chidot;
} Vel_t;

typedef struct{
  double n[3];
  double o[3];
```

-48-

```
    double a[3];
    double p[3];
    double psi;  /*arm angle*/
5   double chi;  /*elbow angle*/
    double t;
  } Frame_t;

10 #define ZEROVEL_T  {{0.,0.,0.},{0.,0.,0.},0.,0.} define VELADD(_AA,_BB,_CC){\
     VADD((_AA).v, (_BB).v, (_CC).v);\
15   VADD((_AA).w, (_BB).w, (_CC).w);\
     (_CC).psidot = (_AA).psidot + (_BB).psidot;\
     (_CC).chidot = (_AA).chidot + (_BB).chidot;\
   }
20 define VELDIF(_AA,_BB,_CC){\
     VDIF((_AA).v, (_BB).v, (_CC).v);\
     VDIF((_AA).w, (_BB).w, (_CC).w);\
25   (_CC).psidot = (_AA).psidot - (_BB).psidot;\
     (_CC).chidot = (_AA).chidot - (_BB).chidot;\
   }

30 #define VELSCALE(_AA,_BB,_CC){\
     register double _DD;\
     _DD = _BB;\
35   VSCALAR((_AA).v, _DD, (_CC).v);\
     VSCALAR((_AA).w, _DD, (_CC).w);\
     (_CC).psidot = (_AA).psidot * _DD;\
```

-49-

```
    (_CC).chidot = (_AA).chidot * _DD;\
} define VELCOPY(_AA,_BB){\
    VCOPY((_AA).v, (_BB).v);\
    VCOPY((_AA).w, (_BB).w);\
    (_BB).psidot = (_AA).psidot;\
    (_BB).chidot = (_AA).chidot;\
} define VELZERO(_AA){\
    VZERO((_AA).v);\
    VZERO((_AA).w);\
    (_AA).psidot = 0.0;\
    (_AA).chidot = 0.0;\
} define VELMAXMAG(_AA,_BB){\
    register double _CC;\
    VMAG((_AA).v, _BB);\
    VMAG((_AA).w, _CC);\
    if( (_BB) < (_CC) )      (_BB) = (_CC);\
    if( (_BB) < (_AA).psidot) (_BB) = (_AA).psidot;\
    if( (_BB) < (_AA).chidot) (_BB) = (_AA).chidot;\
} define VELPRINT(_AA){\
    VPRINT((_AA).v);\
    VPRINT((_AA).w);\
```

```
            -50-
   RPRINT((_AA).psidot);\
   RPRINT((_AA).chidot);\
}

/*****************************************\
*                                         *
* k*sin(phi) = -(nd x n + od x o + ad x a) / 2.0  *
*  cos(phi) = ( (nd . n + od . o + ad . a) / 2.0) - 0.5 *
*                                         *
* _AA is final  (desired) Frame_t         *
* _BB is initial (measured) Frame_t       *
* _CC is the velocity vector Vel_t        *
*                                         *
\*****************************************/
#define FRAMEDIF( _AA, _BB, _CC ){\
  register double _DD[3], _EE[3], _FF[3];\
  register double _SPHI, _CPHI, _MAG;\
  register double _GG, _HH, _II;\
  VDIF( (_AA).p, (_BB).p, (_CC).v );\
  (_CC).psidot = (_AA).psi - (_BB).psi;\
  (_CC).chidot = (_AA).chi - (_BB).chi;\
  VCROSS( (_AA).n, (_BB).n, _DD );\
  VCROSS( (_AA).o, (_BB).o, _EE );\
  VCROSS( (_AA).a, (_BB).a, _FF );\
  VADD3( _DD, _EE, _FF, (_CC).w );\
  VSCALAR( (_CC).w, -0.5, (_CC).w );\
  VMAG( (_CC).w, _SPHI);\
  if(fabs(_SPHI) > EPSILON){\
```

-51-

```
   VDOT( (_AA).n, (_BB).n, _GG );\
   VDOT( (_AA).o, (_BB).o, _HH );\
   VDOT( (_AA).a, (_BB).a, _II );\
   _CPHI = (_GG + _HH + _II) * 0.5 - 0.5;\
   _MAG  = atan2( _SPHI, _CPHI ) / _SPHI;\
   }\
   else _MAG = 0.0;\
   VSCALAR( (_CC).w, _MAG, (_CC).w );\
} define FRAMEINC(_AA, _BB, _CC){\
   register double _RR[3][3], _KK[3];\
   register double _PHI, _SPHI, _CPHI, _VPHI;\
   VADD( (_AA).p, (_BB).v, (_CC).p );\
   (_CC).psi = (_BB).psidot + (_AA).psi;\
   (_CC).chi = (_BB).chidot + (_AA).chi;\
   VMAG( (_BB).w, _PHI );\
   if(fabs(_PHI) > EPSILON)  {VSCALE( (_BB).w, 1.0/_PHI, _KK);}\
   else               {VZERO(_KK);}\
   _SPHI = sin(_PHI);\
   _CPHI = cos(_PHI);\
   _VPHI = 1.0 - _CPHI;\
   _RR[0][0] = _KK[0] * _KK[0] * _VPHI + _CPHI;\
   _RR[1][1] = _KK[1] * _KK[1] * _VPHI + _CPHI;\
   _RR[2][2] = _KK[2] * _KK[2] * _VPHI + _CPHI;\
   _RR[1][0] = _KK[0] * _KK[1] * _VPHI + _KK[2] * _SPHI;\
   _RR[0][1] = _KK[0] * _KK[1] * _VPHI - _KK[2] * _SPHI;\
```

```
_RR[2][0] = _KK[2] * _KK[0] * _VPHI − _KK[1] * _SPHI;\
_RR[0][2] = _KK[2] * _KK[0] * _VPHI + _KK[1] * _SPHI;\
_RR[2][1] = _KK[1] * _KK[2] * _VPHI + _KK[0] * _SPHI;\
_RR[1][2] = _KK[1] * _KK[2] * _VPHI − _KK[0] * _SPHI;\
VROT( (_AA).n, _RR, (_CC).n );\
VROT( (_AA).o, _RR, (_CC).o );\
VROT( (_AA).a, _RR, (_CC).a );\
} define FRAMEPRINT(_AA){\
VPRINT((_AA).n);\
VPRINT((_AA).o);\
VPRINT((_AA).a);\
VPRINT((_AA).p);\
RPRINT((_AA).psi);\
RPRINT((_AA).chi);\
RPRINT((_AA).t);\
}

æ
```

11.3 Macros.h

/*some useful macros*/

/*some useful defines*/
```
#ifndef PI
#define PI 3.1415926535897931
#endif
define INVPI 0.318309886 ifndef HALFPI
define HALFPI 1.5707963267948965
#endif
#ifndef TWOPI
#define TWOPI 6.2831853071795862
endif define EPSILON 1.e-5
define LARGEREAL 1.e10 ifndef TRUE
define TRUE 1
#endif
#ifndef FALSE
#define FALSE 0
endif define ABS(x) (((x) > 0) ? (x) : (-(x)))
define SGN(x) (((x) == 0) ? 0 : (x) / ABS(x))
```

-54-

```
#define DPRINT(message) {                              \
   printf("(file %s, line %d) ", __FILE__, __LINE__);  \
   printf(": %s\n", message);                          \
} define PERROR(routine_call){                          \
   if((routine_call) < 0){                             \
      perror("ERROR: 'routine_call'\n");               \
      exit(-1);                                        \
   }                                                   \
} define VXERROR(routine_call){                         \
   if((routine_call) < 0){                             \
      printf("ERROR: 'routine_call'\n");               \
      exit(-1);                                        \
   }                                                   \
}

/*********************************/ typedef double Vec3_t[3] ;

/*vector operations*/ define VCROSS(_A,_B,_C){\
   _C[0] = _A[1]*_B[2] - _A[2]*_B[1]; \
   _C[1] = _A[2]*_B[0] - _A[0]*_B[2]; \
   _C[2] = _A[0]*_B[1] - _A[1]*_B[0]; \
```

-55-

```
} define VDOT(_A,_B,_C){\
  _C = _A[0]*_B[0] + _A[1]*_B[1] + _A[2]*_B[2];\
} define VMAG(_A,_B){\
  _B = sqrt(_A[0]*_A[0] + _A[1]*_A[1] + _A[2]*_A[2]);\
} define VZERO(_A){\
  _A[0] = 0.0;\
  _A[1] = 0.0;\
  _A[2] = 0.0;\
} define VCOPY(_A,_B){\
  _B[0] = _A[0];\
  _B[1] = _A[1];\
  _B[2] = _A[2];\
} define VDIF(_A,_B,_C){\
  _C[0] = _A[0] - _B[0];\
  _C[1] = _A[1] - _B[1];\
  _C[2] = _A[2] - _B[2];\
} define VADD(_A,_B,_C){\
```

```
    _C[0] = _A[0] + _B[0];\
    _C[1] = _A[1] + _B[1];\
    _C[2] = _A[2] + _B[2];\
} define VADD3(_A,_B,_C,_D){\
    _D[0] = _A[0] + _B[0] + _C[0];\
    _D[1] = _A[1] + _B[1] + _C[1];\
    _D[2] = _A[2] + _B[2] + _C[2];\
} define VSCALAR(_A,_B,_C){\
    _C[0] = _A[0] * _B;\
    _C[1] = _A[1] * _B;\
    _C[2] = _A[2] * _B;\
} define VSCALE(_AA,_BB,_CC){\
    register double _DD;\
    _DD = _BB;\
    VSCALAR(_AA,_DD,_CC);\
} define VUNIT(_AAA,_BBB){\
    register double _DDD;\
    VMAG(_AAA, _DDD);\
    VSCALAR(_AAA, 1.0/_DDD, _BBB);\
}
```

```
/* _CC[i] = _BB[i][j] . _AA[j] */
#define VROT(_AA,_BB,_CC){\
    VDOT(_AA, _BB[0], _CC[0]);\
    VDOT(_AA, _BB[1], _CC[1]);\
    VDOT(_AA, _BB[2], _CC[2]);\
} define VPRINT(_A){ printf("%s = %g, %g, %g\n",
                "_A", _A[0], _A[1], _A[2]);}
#define RPRINT(_A){ printf("%s = %g\n", "_A",
                _A);}
define IPRINT(_A){ printf("%s = %d\n", "_A", _A);} define CLIP(_M,_N,_S){\
    if   (_S > _M) _S = _M;\
    else if(_S < _N) _S = _N;\
}

/***********************************/
typedef struct{
    Vec3_t n;
    Vec3_t o;
    Vec3_t a;
    Vec3_t p;
} HTframe_t;

#define VROT_HT(_XX,_HH,_YY){\
    _YY[0] = _HH.n[0]*_YY[0] +
```

-58-

```
       _HH.o[0]*_YY[1] + _HH.a[0]*_XX[2];\
    _YY[1] = _HH.n[1]*_YY[0] +
       _HH.o[1]*_YY[1] + _HH.a[1]*_XX[2];\
    _YY[2] = _HH.n[2]*_YY[0] +
       _HH.o[2]*_YY[1] + _HH.a[2]*_XX[2];\ } define VIROT_HT(_XX,_HH,_YY){\
       VDOT(_XX,(_HH.n),_YY);\
       VDOT(_XX,(_HH.o),_YY);\
       VDOT(_XX,(_HH.a),_YY);\
    } define VTRANS_HT(_XX,_HH,_YY){\
    _YY[0] = _HH.n[0]*_XX[0] + _HH.o[0]*_XX[1]
       + _HH.a[0]*_XX[2] + _HH.p[0];\
    _YY[1] = _HH.n[1]*_XX[0] + _HH.o[1]*_XX[1] +
       _HH.a[1]*_XX[2] + _HH.p[1];\
    _YY[2] = _HH.n[2]*_XX[0] + _HH.o[2]*_XX[1] +
       _HH.a[2]*_XX[2] + _HH.p[2];\ } define VITRANS_HT(_XX,_HH,_YY){\
       register Vec3_t _ZZZ;\
       VDIF(_XX,_HH.p,_ZZZ);\
       VDOT(_ZZZ,_HH.n,_YY[0]);\
       VDOT(_ZZZ,_HH.o,_YY[1]);\
       VDOT(_ZZZ,_HH.a,_YY[2]);\
    }
```

What is claimed is:

1. A method of controlling a robot manipulator moving toward a target frame $F_0$ with a target velocity $v_0$ comprising a linear target velocity $v$ with an angular target velocity $\omega_0$ to smoothly and continuously divert said robot manipulator to a subsequent frame $F_1$, said target frame being associated with a target transition time $T_0$ and said subsequent frame being associated with a subsequent transition time $T_1$, said method comprising the steps of:

determining a global transition velocity $v_1$ necessary to move said manipulator from said target frame $F_0$ to said subsequent frame $F_1$ within said subsequent transition time $T_1$, said global transition velocity comprising a linear transition velocity $v_1$ and an angular transition velocity $\omega_1$;

defining a blend time interval $2\tau_0$ within which the global velocity of said robot manipulator is to be changed from a global target velocity $v_0$ to said global transition velocity $v_1$ and dividing said blend time interval $2\tau_0$ into discrete time segments $\delta t$;

during each one of said discrete time segments $\delta t$ of said blend interval $2\tau_0$;

(a) computing a blended global velocity $v$ of said manipulator as a blend of said global target velocity $v_0$ and said global transition velocity $v_1$, said blended global velocity $v$ being at least approximately equal to said target global velocity $v_0$ at the beginning of said blend time interval and at least approximately equal to said global transition velocity $v_1$ at the end of said blend time interval, said blended global velocity $v$ comprising a blended angular velocity $\omega$ and a blended linear velocity $v$, and (b) rotating said manipulator by an incremental rotation corresponding to an integration of said blended angular velocity $\omega$ over one discrete time segment $\delta t$.

2. The method of claim 1 wherein the step of defining a blend time interval comprises computing said blend time interval $2\tau_0$ from said global target and transition velocities $v_0$ and $v_1$ and from a predetermined maximum acceleration to which motion of said manipulator is to be limited.

3. The method of claim 2 wherein the step of computing said blend time interval comprises dividing a difference between said global target and transition velocities $v_0$ and $v_1$ by said predetermined maximum acceleration.

4. The method of claim 2 further comprising a velocity error correction step carried out about the beginning of said blend time interval, said velocity error correction comprising the steps of:

determining a desired blend exit frame $F'_0$, said step of determining comprising rotating said target frame $F_0$ through a rotation corresponding to an integration of said angular target velocity $\omega$ over at least a portion of said blend time interval $2\tau_0$;

determining an error correction global velocity $v_e$ required to move from said target frame $F_0$ to said desired blend exit frame $F'_0$ within a correction time interval related to said blend time interval; and correcting said target velocity by adding to it said error correction velocity.

5. The method of claim 4 wherein said portion of said blend time interval is about half said blend time interval.

6. The method of claim 4 wherein said correction time interval is a difference between said target transition time and half said blend time interval, $T_0-\tau_0$.

7. The method of claim 4 wherein the step of determining a desired blend exit frame $F'_0$ further comprises translating said target frame $F_0$ by a displacement corresponding to an integration of said linear target velocity $v$ over at least a portion of said blend time interval $2\tau_0$.

8. The method of claim 1 wherein the step of computing a blended global velocity comprises computing a sum of $v_0(1-f)+v_1(f)$, wherein $f$ changes with each time increment $\delta t$.

9. The method of claim 8 wherein $f$ is a function which is approximately zero at the beginning of said blend time interval and is approximately one at the end of said blend time interval to provide linear blending.

10. The method of claim 8 wherein $f$ is a function which provides one of: (a) third order polynomial velocity blending, (b) cycloidal velocity blending.

11. The method of claim 1 further comprising translating said manipulator by an incremental translation corresponding to an integration of said blended linear velocity $v$ over one discrete time segment $\delta t$ during each of said discrete time segments.

12. The method of claim 1 wherein during a preceding time interval immediately prior to said blend time interval said manipulator is maintained at an approximately constant global velocity equal to said target global velocity $v_0$, while performing the following steps:

dividing said preceding time interval into discrete time segments $\delta t$;

during each one of said discrete time segments of said preceding time interval, rotating said manipulator by an incremental rotation corresponding to an integration of said target angular velocity $\omega_0$ over one discrete time segment $\delta t$.

13. The method of claim 12 further comprising translating said manipulator by an incremental displacement corresponding to an integration of said target linear velocity $v_0$ over one discrete time segment $\delta t$.

14. The method of claim 1 further comprising specifying a sequence of successive target frames $F_i$ associated with respective transition times $T_i$ for i between 1 and n wherein n is an integer, and wherein after the end of each blend time interval said target frame is set to said subsequent frame and said subsequent frame is set to a next one of said successive frames.

15. A method of controlling a robot manipulator moving toward a target frame $F_0$ with a target velocity $v_0$ comprising a linear target velocity $v$ with an angular target velocity $\omega_0$ to smoothly and continuously divert said robot manipulator to a subsequent frame $F_1$, said target frame being associated with a target transition time $T_0$ and said subsequent frame being associated with a subsequent transition time $T_1$, said method comprising the steps of:

determining a global transition velocity $v_1$ necessary to move said manipulator from said target frame $F_0$ to said subsequent frame $F_1$ within said subsequent transition time $T_1$, said global transition velocity comprising a linear transition velocity $v_1$ and an angular transition velocity $\omega_1$;

defining a blend time interval $2\tau_0$ within which the global velocity of said robot manipulator is to be changed from a global target velocity $v_0$ to said global transition velocity $v_1$ and dividing said blend time interval $2\tau_0$ into discrete time segments $\delta t$;

during each one of said discrete time segments $\delta t$ of said blend interval $2\tau_0$;

(a) computing a blended global velocity $v$ of said manipulator as a blend of said global target velocity $v_0$ and said global transition velocity $v_1$, said blended global velocity v being at least approximately equal to said target global velocity $v_0$ at the beginning of said blend time interval and at least approximately equal to said global transition velocity $v_1$ at the end of said blend time interval, said blended global velocity v comprising a blended angular velocity $\omega$ and a blended linear velocity v, and (b) changing an actual global velocity of said manipulator in accordance with said blended angular velocity $\omega$.

16. The method of claim 15 wherein the step of defining a blend time interval comprises computing said blend time interval $2\tau_0$ from said global target and transition velocities $v_0$ and $v_1$ and from a predetermined maximum acceleration to which motion of said manipulator is to be limited.

17. The method of claim 16 wherein the step of computing said blend time interval comprises dividing a difference between said global target and transition velocities $v_0$ and $v_1$ by said predetermined maximum acceleration.

18. The method of claim 16 further comprising a velocity error correction step carried out about the beginning of said blend time interval, said velocity error correction comprising the steps of:

determining a desired blend exit frame $F'_0$, said step of determining comprising rotating said target frame $F_0$ through a rotation corresponding to an integration of said angular target velocity $\omega$ over at least a portion of said blend time interval $2\tau_0$;

determining an error correction global velocity $v_e$ required to move from said target frame $F_0$ to said desired blend exit frame $F'_0$ within a correction time interval related to said blend time interval; and correcting said target velocity by adding to it said error correction velocity.

19. The method of claim 18 wherein said portion of said blend time interval is about half said blend time interval.

20. The method of claim 18 wherein said correction time interval is a difference between said target transition time and half said blend time interval, $T_0-\tau_0$.

21. The method of claim 15 wherein the step of computing a blended global velocity comprises computing a sum of $v_0(1-f)+v_1(f)$, wherein $f$ changes with each time increment $\delta t$.

22. The method of claim 21 wherein $f$ is a function which is approximately zero at the beginning of said blend time interval and is approximately one at the end of said blend time interval to provide linear blending.

23. The method of claim 21 wherein $f$ is a function which provides one of: (a) third order polynomial velocity blending, (b) cycloidal velocity blending.

* * * * *